United States Patent
Mueller et al.

(10) Patent No.: US 11,846,097 B2
(45) Date of Patent: Dec. 19, 2023

(54) FIBER PRODUCTS HAVING TEMPERATURE CONTROL ADDITIVES

(71) Applicants: KNAUF INSULATION, INC., Shelbyville, IN (US); KNAUF INSULATION SPRL, Visé (BE)

(72) Inventors: Gert Mueller, New Albany, OH (US); Charles Fitch Appley, Cumberland, IN (US)

(73) Assignees: Knauf Insulation, Inc., Shelbyville, IN (US); Knauf Insulation SPRL, Vise (BE)

( * ) Notice: Subject to any disclaimer, the term of this patent is extended or adjusted under 35 U.S.C. 154(b) by 0 days.

(21) Appl. No.: 15/959,131

(22) Filed: Apr. 20, 2018

(65) Prior Publication Data
US 2018/0238049 A1    Aug. 23, 2018

Related U.S. Application Data

(63) Continuation of application No. 15/222,122, filed on Jul. 28, 2016, now abandoned, which is a
(Continued)

(51) Int. Cl.
*E04B 1/78* (2006.01)
*E04B 1/74* (2006.01)
(Continued)

(52) U.S. Cl.
CPC ............ *E04B 1/78* (2013.01); *B05D 3/007* (2013.01); *B29C 43/22* (2013.01); *D04H 1/587* (2013.01);
(Continued)

(58) Field of Classification Search
CPC .... B05D 3/007; B29C 43/22; B29K 2003/00; B29K 2105/12; B29K 2309/00;
(Continued)

(56) References Cited

U.S. PATENT DOCUMENTS 1,801,052 A    4/1931    Meigs
1,801,053 A    4/1931    Meigs
(Continued)

FOREIGN PATENT DOCUMENTS

AU    8538765    8/1985
AU    9640921    7/1997
(Continued)

OTHER PUBLICATIONS

International Search Report and Written Opinion for PCT/US2008/059730, completed Sep. 22, 2008.
(Continued)

*Primary Examiner* — Shuangyi Abu Ali
(74) *Attorney, Agent, or Firm* — Knauf Insulation, Inc.; James K. Blodgett

(57) ABSTRACT

A fiber product is described which includes fibers, a binder and a temperature control additive. The fiber product has properties that make it useful for a variety of applications. The fibers may be glass fibers and the product may be a fiberglass insulation product for use in buildings, vehicles, or other structures for acoustic and/or thermal insulation. The fibers may be cellulosic fibers and the product may be a wood board product. The temperature control additive is incorporated into the uncured fiber product to prevent deleterious self-heating during or after binder curing. The temperature control additive undergoes an endothermic process that consumes at least a portion of the energy generated during the exothermic curing reaction.

16 Claims, 5 Drawing Sheets

Related U.S. Application Data continuation of application No. 14/810,765, filed on Jul. 28, 2015, now abandoned, which is a continuation of application No. 13/702,144, filed as application No. PCT/EP2011/059317 on Jun. 6, 2011, now abandoned.

(60) Provisional application No. 61/352,070, filed on Jun. 7, 2010.

(51) Int. Cl.
    *E04B 1/84*     (2006.01)
    *E04B 1/88*     (2006.01)
    *B05D 3/00*     (2006.01)
    *D04H 1/587*     (2012.01)
    *D04H 1/64*     (2012.01)
    *B29C 43/22*     (2006.01)
    *B29K 105/12*     (2006.01)
    *B29K 309/00*     (2006.01)
    *B29L 23/00*     (2006.01)
    *E04B 1/76*     (2006.01)

(52) U.S. Cl.
    CPC ........... *D04H 1/64* (2013.01); *E04B 1/74* (2013.01); *E04B 1/84* (2013.01); *E04B 1/88* (2013.01); *B29K 2003/00* (2013.01); *B29K 2105/12* (2013.01); *B29K 2309/00* (2013.01); *B29L 2023/225* (2013.01); *E04B 2001/7683* (2013.01)

(58) Field of Classification Search
    CPC .... B29L 2023/225; D04H 1/587; D04H 1/64; E04B 1/74; E04B 1/78; E04B 1/84; E04B 1/88; E04B 2001/7683
    See application file for complete search history.

(56) References Cited

U.S. PATENT DOCUMENTS

| | | |
|---|---|---|
| 1,886,353 A | 11/1932 | Novotny et al. |
| 1,902,948 A | 3/1933 | Castle |
| 1,964,263 A | 6/1934 | Krenke |
| 2,198,874 A | 4/1940 | Leighton |
| 2,215,825 A | 9/1940 | Wallace et al. |
| 2,261,295 A | 11/1941 | Schlack |
| 2,362,086 A | 11/1944 | Eastes et al. |
| 2,371,990 A | 3/1945 | Hanford |
| 2,392,105 A | 1/1946 | Sussman |
| 2,442,989 A | 6/1948 | Sussman |
| 2,500,665 A | 3/1950 | Courtright |
| 2,518,956 A | 8/1950 | Sussman |
| 2,875,073 A | 2/1959 | Gogek |
| 2,894,920 A | 7/1959 | Ramos |
| 2,965,504 A | 12/1960 | Gogek |
| 3,038,462 A | 6/1962 | Bohdan |
| 3,138,473 A | 6/1964 | Floyd et al. |
| 3,222,243 A | 12/1965 | Gaston et al. |
| 3,231,349 A | 1/1966 | Stalego |
| 3,232,821 A | 2/1966 | Banks et al. |
| 3,297,419 A | 1/1967 | Eyre, Jr. |
| 3,513,001 A | 5/1970 | Woodhead et al. |
| 3,551,365 A | 12/1970 | Matalon |
| 3,784,408 A | 1/1974 | Jaffe et al. |
| 3,791,807 A | 2/1974 | Etzel et al. |
| 3,802,897 A | 4/1974 | Bovier et al. |
| 3,809,664 A | 5/1974 | Burr et al. |
| 3,826,767 A | 7/1974 | Hoover et al. |
| 3,856,606 A | 12/1974 | Fan et al. |
| 3,867,119 A | 2/1975 | Takeo et al. |
| 3,907,724 A | 9/1975 | Higginbottom |
| 3,911,048 A | 10/1975 | Nistri et al. |
| 3,919,134 A | 11/1975 | Higginbottom |
| 3,922,466 A | 11/1975 | Bell et al. |
| 3,955,031 A | 5/1976 | Jones et al. |
| 3,956,204 A | 5/1976 | Higginbottom |
| 3,961,081 A | 6/1976 | Mckenzie |
| 3,971,807 A | 7/1976 | Brack |
| 4,014,726 A | 3/1977 | Fargo |
| 4,028,290 A | 6/1977 | Reid |
| 4,048,127 A | 9/1977 | Gibbons et al. |
| 4,054,713 A | 10/1977 | Sakaguchi et al. |
| 4,085,076 A | 4/1978 | Gibbons et al. |
| 4,097,427 A | 6/1978 | Aitken et al. |
| 4,107,379 A | 8/1978 | Stofko |
| 4,109,057 A | 8/1978 | Nakamura et al. |
| 4,144,027 A | 3/1979 | Habib |
| 4,148,765 A | 4/1979 | Nelson |
| 4,183,997 A | 1/1980 | Stofko |
| 4,184,986 A | 1/1980 | Krasnobajew et al. |
| 4,186,053 A | 1/1980 | Krasnobajew et al. |
| 4,201,247 A | 5/1980 | Shannon |
| 4,201,857 A | 5/1980 | Krasnobajew et al. |
| 4,217,414 A | 8/1980 | Walon |
| 4,233,432 A | 11/1980 | Curtis, Jr. |
| 4,246,367 A | 1/1981 | Curtis, Jr. |
| 4,259,190 A | 3/1981 | Fahey |
| 4,265,963 A | 5/1981 | Matalon |
| 4,278,573 A | 7/1981 | Tessler |
| 4,296,173 A | 10/1981 | Fahey |
| 4,301,310 A | 11/1981 | Wagner |
| 4,310,585 A | 1/1982 | Shannon |
| 4,322,523 A | 3/1982 | Wagner |
| 4,330,443 A | 5/1982 | Rankin |
| 4,333,484 A | 6/1982 | Keritsis |
| 4,357,194 A | 11/1982 | Stofko |
| 4,361,588 A | 11/1982 | Herz |
| 4,379,101 A | 4/1983 | Smith |
| 4,393,019 A | 7/1983 | Geimer |
| 4,396,430 A | 8/1983 | Matalon |
| 4,400,496 A | 8/1983 | Butler et al. |
| 4,464,523 A | 8/1984 | Neigel et al. |
| 4,506,684 A | 3/1985 | Keritsis |
| 4,520,143 A | 5/1985 | Jellinek |
| 4,524,164 A | 6/1985 | Viswanathan et al. |
| 4,631,226 A | 12/1986 | Jellinek |
| 4,654,259 A | 3/1987 | Stofko |
| 4,668,716 A | 5/1987 | Pepe et al. |
| 4,692,478 A | 9/1987 | Viswanathan et al. |
| 4,714,727 A | 12/1987 | Hume, III |
| 4,720,295 A | 1/1988 | Bronshtein |
| 4,734,996 A | 4/1988 | Kim et al. |
| 4,754,056 A | 6/1988 | Ansel et al. |
| 4,761,184 A | 8/1988 | Markessini |
| 4,780,339 A | 10/1988 | Lacourse et al. |
| 4,828,643 A | 5/1989 | Newman et al. |
| 4,845,162 A | 7/1989 | Schmitt et al. |
| 4,906,237 A | 3/1990 | Johansson et al. |
| 4,912,147 A | 3/1990 | Pfoehler et al. |
| 4,918,861 A | 4/1990 | Carpenter et al. |
| 4,923,980 A | 5/1990 | Blomberg |
| 4,950,444 A | 8/1990 | Deboufie et al. |
| 4,988,780 A | 1/1991 | Das et al. |
| 4,992,519 A | 2/1991 | Mukherjee |
| 5,001,202 A | 3/1991 | Denis et al. |
| 5,013,405 A | 5/1991 | Izard |
| 5,032,431 A | 7/1991 | Conner et al. |
| 5,037,930 A | 8/1991 | Shih |
| 5,041,595 A | 8/1991 | Yang et al. |
| 5,089,342 A | 2/1992 | Dhein et al. |
| 5,095,054 A | 3/1992 | Lay et al. |
| 5,106,615 A | 4/1992 | Dikstein |
| 5,114,004 A | 5/1992 | Isono et al. |
| 5,123,949 A | 6/1992 | Thiessen |
| 5,124,369 A | 6/1992 | Vandichel et al. |
| 5,128,407 A | 7/1992 | Layton et al. |
| 5,143,582 A | 9/1992 | Arkens et al. |
| 5,151,465 A | 9/1992 | Le-Khac |
| 5,167,738 A | 12/1992 | Bichot et al. |
| 5,198,492 A | 3/1993 | Stack |
| 5,217,741 A | 6/1993 | Kawachi et al. |
| 5,218,048 A | 6/1993 | Abe et al. |
| 5,240,498 A | 8/1993 | Matalon et al. |

(56) References Cited

U.S. PATENT DOCUMENTS

| | | |
|---|---|---|
| 5,278,222 A | 1/1994 | Stack |
| 5,300,144 A | 4/1994 | Adams |
| 5,300,192 A | 4/1994 | Hansen et al. |
| 5,308,896 A | 5/1994 | Hansen et al. |
| 5,318,990 A | 6/1994 | Strauss |
| 5,336,753 A | 8/1994 | Jung et al. |
| 5,336,755 A | 8/1994 | Pape |
| 5,336,766 A | 8/1994 | Koga et al. |
| 5,340,868 A | 8/1994 | Strauss et al. |
| 5,352,480 A | 10/1994 | Hansen et al. |
| 5,367,849 A | 11/1994 | Bullock |
| 5,371,194 A | 12/1994 | Ferretti |
| 5,387,665 A | 2/1995 | Misawa et al. |
| 5,389,716 A | 2/1995 | Graves |
| 5,393,849 A | 2/1995 | Srinivasan et al. |
| 5,416,139 A | 5/1995 | Zeiszler |
| 5,421,838 A | 6/1995 | Gosset et al. |
| 5,424,418 A | 6/1995 | Duflot |
| 5,434,233 A | 7/1995 | Kiely et al. |
| 5,447,977 A | 9/1995 | Hansen et al. |
| 5,470,843 A | 11/1995 | Stahl et al. |
| 5,480,973 A | 1/1996 | Goodlad et al. |
| 5,492,756 A | 2/1996 | Seale et al. |
| 5,498,662 A | 3/1996 | Tanaka et al. |
| 5,503,920 A | 4/1996 | Alkire et al. |
| 5,534,612 A | 7/1996 | Taylor et al. |
| 5,536,766 A | 7/1996 | Seyffer et al. |
| 5,538,783 A | 7/1996 | Hansen et al. |
| 5,543,215 A | 8/1996 | Hansen et al. |
| 5,545,279 A | 8/1996 | Hall et al. |
| 5,547,541 A | 8/1996 | Hansen et al. |
| 5,547,745 A | 8/1996 | Hansen et al. |
| 5,550,189 A | 8/1996 | Qin et al. |
| 5,554,730 A | 9/1996 | Woiszwillo et al. |
| 5,562,740 A | 10/1996 | Cook et al. |
| 5,571,618 A | 11/1996 | Hansen et al. |
| 5,578,678 A | 11/1996 | Hartmann et al. |
| 5,580,856 A | 12/1996 | Prestrelski et al. |
| 5,582,682 A | 12/1996 | Ferretti |
| 5,583,193 A | 12/1996 | Aravindakshan et al. |
| 5,589,256 A | 12/1996 | Hansen et al. |
| 5,589,536 A | 12/1996 | Golino et al. |
| 5,607,759 A | 3/1997 | Hansen et al. |
| 5,608,011 A | 3/1997 | Eck et al. |
| 5,609,727 A | 3/1997 | Hansen et al. |
| 5,614,570 A | 3/1997 | Hansen et al. |
| 5,620,940 A | 4/1997 | Birbara et al. |
| 5,621,026 A | 4/1997 | Tanaka et al. |
| 5,633,298 A | 5/1997 | Arfaei et al. |
| 5,641,561 A | 6/1997 | Hansen et al. |
| 5,643,978 A | 7/1997 | Darwin et al. |
| 5,645,756 A | 7/1997 | Dubin et al. |
| 5,660,904 A | 8/1997 | Andersen et al. |
| 5,661,213 A | 8/1997 | Arkens et al. |
| 5,670,585 A | 9/1997 | Taylor et al. |
| 5,672,418 A | 9/1997 | Hansen et al. |
| 5,672,659 A | 9/1997 | Shalaby et al. |
| 5,690,715 A | 11/1997 | Schiwek |
| 5,691,060 A | 11/1997 | Levy |
| 5,693,411 A | 12/1997 | Hansen et al. |
| 5,719,092 A | 2/1998 | Arrington |
| 5,719,228 A | 2/1998 | Taylor et al. |
| 5,733,624 A | 3/1998 | Syme et al. |
| 5,756,580 A | 5/1998 | Natori et al. |
| 5,763,524 A | 6/1998 | Arkens et al. |
| 5,788,243 A | 8/1998 | Harshaw et al. |
| 5,788,423 A | 8/1998 | Perkins |
| 5,807,364 A | 9/1998 | Hansen |
| 5,855,987 A | 1/1999 | Margel et al. |
| 5,863,985 A | 1/1999 | Shalaby et al. |
| 5,885,337 A | 3/1999 | Nohr et al. |
| 5,895,804 A | 4/1999 | Lee et al. |
| 5,905,115 A | 5/1999 | Luitjes et al. |
| 5,916,503 A | 6/1999 | Rettenbacher |
| 5,919,528 A | 7/1999 | Huijs et al. |
| 5,919,831 A | 7/1999 | Philipp |
| 5,922,403 A | 7/1999 | Tecle |
| 5,925,722 A | 7/1999 | Exner et al. |
| 5,929,184 A | 7/1999 | Holmes-Farley et al. |
| 5,929,196 A | 7/1999 | Kissel et al. |
| 5,932,344 A | 8/1999 | Ikemoto et al. |
| 5,932,665 A | 8/1999 | DePorter et al. |
| 5,932,689 A | 8/1999 | Arkens et al. |
| 5,942,123 A | 8/1999 | McArdle |
| 5,954,869 A | 9/1999 | Elfersy et al. |
| 5,977,224 A | 11/1999 | Cheung et al. |
| 5,977,232 A | 11/1999 | Arkens et al. |
| 5,981,719 A | 11/1999 | Woiszwillo et al. |
| 5,983,586 A | 11/1999 | Berdan, II et al. |
| 5,990,216 A | 11/1999 | Cai et al. |
| 5,993,709 A | 11/1999 | Bonomo et al. |
| 6,022,615 A | 2/2000 | Rettenbacher |
| 6,067,821 A | 5/2000 | Jackson et al. |
| 6,071,549 A | 6/2000 | Hansen |
| 6,071,994 A | 6/2000 | Hummerich et al. |
| 6,072,086 A | 6/2000 | James et al. |
| 6,077,883 A | 6/2000 | Taylor et al. |
| 6,090,925 A | 7/2000 | Woiszwillo et al. |
| 6,114,033 A | 9/2000 | Ikemoto et al. |
| 6,114,464 A | 9/2000 | Reck et al. |
| 6,133,347 A | 10/2000 | Vickers, Jr. et al. |
| 6,136,916 A | 10/2000 | Arkens et al. |
| 6,139,619 A | 10/2000 | Zaretskiy et al. |
| 6,143,243 A | 11/2000 | Gershun et al. |
| 6,171,444 B1 | 1/2001 | Nigam |
| 6,171,654 B1 | 1/2001 | Salsman et al. |
| 6,180,037 B1 | 1/2001 | Andersen et al. |
| 6,194,512 B1 | 2/2001 | Chen et al. |
| 6,210,472 B1 | 4/2001 | Kwan et al. |
| 6,221,958 B1 | 4/2001 | Shalaby et al. |
| 6,221,973 B1 | 4/2001 | Arkens et al. |
| 6,231,721 B1 | 5/2001 | Quick et al. |
| 6,274,661 B1 | 8/2001 | Chen et al. |
| 6,281,298 B1 | 8/2001 | Papsin, Jr. |
| 6,299,677 B1 | 10/2001 | Johnson et al. |
| 6,299,936 B1 | 10/2001 | Reck et al. |
| 6,307,732 B1 | 10/2001 | Tsubaki et al. |
| 6,310,227 B1 | 10/2001 | Sarama et al. |
| 6,313,102 B1 | 11/2001 | Colaco et al. |
| 6,319,683 B1 | 11/2001 | James et al. |
| 6,331,350 B1 | 12/2001 | Taylor et al. |
| 6,331,513 B1 | 12/2001 | Zaid et al. |
| 6,340,411 B1 | 1/2002 | Hansen et al. |
| 6,348,530 B1 | 2/2002 | Reck et al. |
| 6,365,079 B1 | 4/2002 | Winkler et al. |
| 6,372,077 B1 | 4/2002 | Tecle |
| 6,379,739 B1 | 4/2002 | Formanek et al. |
| 6,379,814 B1 | 4/2002 | Dupre et al. |
| 6,395,856 B1 | 5/2002 | Petty et al. |
| 6,403,665 B1 | 6/2002 | Sieker et al. |
| 6,407,225 B1 | 6/2002 | Mang et al. |
| 6,410,036 B1 | 6/2002 | De Rosa et al. |
| 6,440,204 B1 | 8/2002 | Rogols et al. |
| 6,441,122 B1 | 8/2002 | DeMott et al. |
| 6,461,553 B1 | 10/2002 | Hansen et al. |
| 6,468,442 B2 | 10/2002 | Bytnar |
| 6,468,730 B2 | 10/2002 | Fujiwara et al. |
| 6,469,120 B1 | 10/2002 | Elfersy et al. |
| 6,475,552 B1 | 11/2002 | Shah et al. |
| 6,482,875 B2 | 11/2002 | Lorenz et al. |
| 6,495,656 B1 | 12/2002 | Haile et al. |
| 6,521,339 B1 | 2/2003 | Hansen et al. |
| 6,525,009 B2 | 2/2003 | Sachdev et al. |
| 6,538,057 B1 | 3/2003 | Wildburg et al. |
| 6,547,867 B2 | 4/2003 | Rogols et al. |
| 6,555,616 B1 | 4/2003 | Helbing et al. |
| 6,559,302 B1 | 5/2003 | Shah et al. |
| 6,562,267 B1 | 5/2003 | Hansen et al. |
| 6,596,103 B1 | 7/2003 | Hansen et al. |
| 6,613,378 B1 | 9/2003 | Erhan et al. |
| 6,638,882 B1 | 10/2003 | Helbing et al. |
| 6,638,884 B2 | 10/2003 | Quick et al. |
| 6,699,945 B1 | 3/2004 | Chen et al. |
| 6,706,853 B1 | 3/2004 | Stanssens et al. |

(56) References Cited

U.S. PATENT DOCUMENTS

| | | | |
|---|---|---|---|
| 6,719,862 B2 | 4/2004 | Quick et al. |
| 6,730,730 B1 | 5/2004 | Hansen et al. |
| 6,753,361 B2 | 6/2004 | Kroner et al. |
| 6,818,694 B2 | 11/2004 | Hindi et al. |
| 6,821,547 B2 | 11/2004 | Shah et al. |
| 6,852,247 B2 | 2/2005 | Bytnar |
| 6,858,074 B2 | 2/2005 | Anderson et al. |
| 6,861,495 B2 | 3/2005 | Barsotti et al. |
| 6,864,044 B2 | 3/2005 | Ishikawa et al. |
| 6,878,800 B2 | 4/2005 | Husemoen et al. |
| 6,884,849 B2 | 4/2005 | Chen et al. |
| 6,955,844 B2 | 10/2005 | Tagge et al. |
| 6,962,714 B2 | 11/2005 | Hei et al. |
| 6,989,171 B2 | 1/2006 | Portman |
| 6,992,203 B2 | 1/2006 | Trusovs |
| 7,018,490 B2 | 3/2006 | Hansen et al. |
| 7,029,717 B1 | 4/2006 | Ojima et al. |
| 7,067,579 B2 | 6/2006 | Taylor et al. |
| 7,083,831 B1 | 8/2006 | Koch et al. |
| 7,090,745 B2 | 8/2006 | Beckman et al. |
| 7,141,626 B2 | 11/2006 | Rodrigues et al. |
| 7,144,474 B1 | 12/2006 | Hansen et al. |
| 7,195,792 B2 | 3/2007 | Boston et al. |
| 7,201,778 B2 | 4/2007 | Smith et al. |
| 7,201,825 B2 | 4/2007 | Dezutter et al. |
| 7,202,326 B2 | 4/2007 | Kuroda et al. |
| 7,241,487 B2 | 7/2007 | Taylor et al. |
| 7,458,235 B2 | 12/2008 | Beaufils et al. |
| 7,514,027 B2 | 4/2009 | Horres et al. |
| 7,655,711 B2 | 2/2010 | Swift et al. |
| 7,772,347 B2 | 8/2010 | Swift et al. |
| 7,795,354 B2 | 9/2010 | Srinivasan et al. |
| 7,803,879 B2 | 9/2010 | Srinivasan et al. |
| 7,807,771 B2 | 10/2010 | Swift et al. |
| 7,842,382 B2 | 11/2010 | Helbing |
| 7,854,980 B2 | 12/2010 | Jackson et al. |
| 7,883,693 B2 | 2/2011 | Sehl et al. |
| 7,888,445 B2 | 2/2011 | Swift et al. |
| 7,947,765 B2 | 5/2011 | Swift et al. |
| 8,114,210 B2 | 2/2012 | Hampson et al. |
| 8,182,648 B2 | 5/2012 | Swift et al. |
| 8,211,923 B2 | 7/2012 | Wagner et al. |
| 8,372,900 B2 | 2/2013 | Shooshtari et al. |
| 8,377,564 B2 | 2/2013 | Shooshtari et al. |
| 8,501,838 B2 | 8/2013 | Jackson et al. |
| 8,680,224 B2 | 3/2014 | Zhang et al. |
| 8,691,934 B2 | 4/2014 | Helbing et al. |
| 8,900,495 B2 | 12/2014 | Pacorel et al. |
| 2001/0017427 A1 | 8/2001 | Rosthauser et al. |
| 2001/0046824 A1 | 11/2001 | Nigam |
| 2002/0000100 A1 | 1/2002 | Burg et al. |
| 2002/0025435 A1 | 2/2002 | Hansen et al. |
| 2002/0026025 A1 | 2/2002 | Kuo et al. |
| 2002/0028857 A1 | 3/2002 | Holy |
| 2002/0032253 A1 | 3/2002 | Lorenz et al. |
| 2002/0042473 A1 | 4/2002 | Trollsas et al. |
| 2002/0091185 A1 | 7/2002 | Taylor et al. |
| 2002/0096278 A1 | 7/2002 | Foster et al. |
| 2002/0123598 A1 | 9/2002 | Sieker et al. |
| 2002/0130439 A1 | 9/2002 | Kroner et al. |
| 2002/0161108 A1 | 10/2002 | Schultz et al. |
| 2002/0197352 A1 | 12/2002 | Portman |
| 2003/0005857 A1 | 1/2003 | Minami et al. |
| 2003/0040239 A1 | 2/2003 | Toas et al. |
| 2003/0044513 A1 | 3/2003 | Shah et al. |
| 2003/0066523 A1 | 4/2003 | Lewis et al. |
| 2003/0071879 A1 | 4/2003 | Swenson |
| 2003/0116294 A1 | 6/2003 | Kehrer et al. |
| 2003/0134945 A1 | 7/2003 | Capps |
| 2003/0148084 A1 | 8/2003 | Trocino |
| 2003/0153690 A1 | 8/2003 | Husemoen et al. |
| 2003/0185991 A1 | 10/2003 | Wigger et al. |
| 2003/0203117 A1 | 10/2003 | Bartkowiak et al. |
| 2004/0002567 A1 | 1/2004 | Chen et al. |
| 2004/0019168 A1 | 1/2004 | Soerens et al. |
| 2004/0024170 A1 | 2/2004 | Husemoen et al. |
| 2004/0033269 A1 | 2/2004 | Hei et al. |
| 2004/0033747 A1 | 2/2004 | Miller et al. |
| 2004/0034154 A1 | 2/2004 | Tutin et al. |
| 2004/0038017 A1 | 2/2004 | Tutin et al. |
| 2004/0048531 A1 | 3/2004 | Belmares et al. |
| 2004/0077055 A1 | 4/2004 | Fosdick et al. |
| 2004/0079499 A1 | 4/2004 | Dezutter et al. |
| 2004/0087024 A1 | 5/2004 | Bellocq et al. |
| 2004/0087719 A1 | 5/2004 | Rautschek et al. |
| 2004/0122166 A1 | 6/2004 | O'Brien-Bernini et al. |
| 2004/0131874 A1 | 7/2004 | Tutin et al. |
| 2004/0144706 A1 | 7/2004 | Beaufils et al. |
| 2004/0152824 A1 | 8/2004 | Dobrowolski |
| 2004/0161993 A1 | 8/2004 | Tripp et al. |
| 2004/0209851 A1 | 10/2004 | Nelson et al. |
| 2004/0213930 A1 | 10/2004 | Halabisky |
| 2004/0220368 A1 | 11/2004 | Li et al. |
| 2004/0249066 A1 | 12/2004 | Heinzman et al. |
| 2004/0254285 A1 | 12/2004 | Rodrigues et al. |
| 2004/0260082 A1 | 12/2004 | Van Der Wilden et al. |
| 2005/0001198 A1 | 1/2005 | Bytnar |
| 2005/0013980 A1* | 1/2005 | Toas ................... D06M 11/82 428/292.1 |
| 2005/0017394 A1 | 1/2005 | Hochsmann et al. |
| 2005/0027283 A1 | 2/2005 | Richard et al. |
| 2005/0033037 A1 | 2/2005 | Trusovs |
| 2005/0048212 A1 | 3/2005 | Clamen et al. |
| 2005/0059770 A1 | 3/2005 | Srinivasan et al. |
| 2005/0171085 A1 | 8/2005 | Pinto et al. |
| 2005/0196421 A1 | 9/2005 | Hunter et al. |
| 2005/0202224 A1 | 9/2005 | Helbing |
| 2005/0208852 A1 | 9/2005 | Weber |
| 2005/0215153 A1 | 9/2005 | Cossement et al. |
| 2005/0245669 A1 | 11/2005 | Clungeon et al. |
| 2005/0275133 A1 | 12/2005 | Cabell et al. |
| 2005/0288479 A1 | 12/2005 | Kuroda et al. |
| 2006/0005580 A1 | 1/2006 | Espiard et al. |
| 2006/0009569 A1 | 1/2006 | Charbonneau et al. |
| 2006/0044302 A1 | 3/2006 | Chen |
| 2006/0099870 A1 | 5/2006 | Garcia et al. |
| 2006/0111480 A1 | 5/2006 | Hansen et al. |
| 2006/0124538 A1 | 6/2006 | Morcrette et al. |
| 2006/0135433 A1 | 6/2006 | Murray et al. |
| 2006/0141177 A1 | 6/2006 | Ligtenberg et al. |
| 2006/0179892 A1 | 8/2006 | Horres et al. |
| 2006/0188465 A1 | 8/2006 | Perrier et al. |
| 2006/0198954 A1 | 9/2006 | Frechem et al. |
| 2006/0231487 A1 | 10/2006 | Bartley et al. |
| 2006/0252855 A1 | 11/2006 | Pisanova et al. |
| 2006/0281622 A1 | 12/2006 | Maricourt et al. |
| 2007/0006390 A1 | 1/2007 | Clamen et al. |
| 2007/0009582 A1 | 1/2007 | Madsen et al. |
| 2007/0027281 A1 | 2/2007 | Michl et al. |
| 2007/0027283 A1* | 2/2007 | Swift ................... E04B 1/84 527/312 |
| 2007/0039520 A1 | 2/2007 | Crews et al. |
| 2007/0082983 A1 | 4/2007 | Crews et al. |
| 2007/0123679 A1 | 5/2007 | Swift et al. |
| 2007/0123680 A1* | 5/2007 | Swift ................... C07H 5/04 527/312 |
| 2007/0129522 A1 | 6/2007 | Burckhardt et al. |
| 2007/0142596 A1 | 6/2007 | Swift et al. |
| 2007/0158022 A1 | 7/2007 | Heep et al. |
| 2007/0184740 A1 | 8/2007 | Keller et al. |
| 2007/0191574 A1 | 8/2007 | Miller et al. |
| 2007/0270070 A1 | 11/2007 | Othman |
| 2007/0287018 A1 | 12/2007 | Tutin et al. |
| 2007/0292618 A1 | 12/2007 | Srinivasan et al. |
| 2007/0292619 A1 | 12/2007 | Srinivasan et al. |
| 2007/0298274 A1 | 12/2007 | Eriksson et al. |
| 2008/0009209 A1 | 1/2008 | Clamen et al. |
| 2008/0009616 A1 | 1/2008 | Frank et al. |
| 2008/0051539 A1 | 2/2008 | Kelly |
| 2008/0060551 A1 | 3/2008 | Crews et al. |
| 2008/0081138 A1 | 4/2008 | Moore et al. |
| 2008/0108741 A1 | 5/2008 | Van Herwijnen et al. |
| 2008/0160260 A1 | 7/2008 | Wada et al. |
| 2008/0160302 A1 | 7/2008 | Asrar et al. |

(56) References Cited

U.S. PATENT DOCUMENTS

| | | |
|---|---|---|
| 2008/0194738 A1 | 8/2008 | Crews et al. |
| 2009/0169867 A1 | 7/2009 | Kelly |
| 2009/0170978 A1 | 7/2009 | Kelly |
| 2009/0227732 A1 | 9/2009 | Glockner et al. |
| 2009/0301972 A1 | 12/2009 | Hines et al. |
| 2009/0304919 A1 | 12/2009 | Huenig et al. |
| 2009/0306255 A1 | 12/2009 | Patel et al. |
| 2009/0324915 A1 | 12/2009 | Swift et al. |
| 2010/0029160 A1 | 2/2010 | Srinivasan et al. |
| 2010/0058661 A1 | 3/2010 | Jackson et al. |
| 2010/0080976 A1 | 4/2010 | Jackson et al. |
| 2010/0084598 A1 | 4/2010 | Jackson et al. |
| 2010/0086726 A1 | 4/2010 | Jackson et al. |
| 2010/0087571 A1 | 4/2010 | Jackson et al. |
| 2010/0098947 A1 | 4/2010 | Inoue et al. |
| 2010/0117023 A1 | 5/2010 | Dopico et al. |
| 2010/0129640 A1 | 5/2010 | Kelly |
| 2010/0130649 A1 | 5/2010 | Swift et al. |
| 2010/0175826 A1 | 7/2010 | Huenig et al. |
| 2010/0210595 A1 | 8/2010 | Wagner et al. |
| 2010/0222463 A1 | 9/2010 | Brady et al. |
| 2010/0222566 A1 | 9/2010 | Fosdick et al. |
| 2010/0282996 A1 | 11/2010 | Jaffrennou et al. |
| 2010/0301256 A1 | 12/2010 | Hampson et al. |
| 2010/0320113 A1 | 12/2010 | Swift |
| 2011/0021672 A1 | 1/2011 | Crews et al. |
| 2011/0039111 A1 | 2/2011 | Shooshtari |
| 2011/0040010 A1 | 2/2011 | Shooshtari |
| 2011/0042303 A1 | 2/2011 | Shooshtari et al. |
| 2011/0045966 A1 | 2/2011 | Shooshtari et al. |
| 2011/0089074 A1 | 4/2011 | Jackson et al. |
| 2011/0135937 A1 | 6/2011 | Swift et al. |
| 2011/0190425 A1 | 8/2011 | Swift |
| 2011/0220835 A1 | 9/2011 | Swift et al. |
| 2011/0256790 A1* | 10/2011 | Toas .................. E04B 1/78 442/327 |
| 2011/0260094 A1 | 10/2011 | Hampson et al. |
| 2011/0262648 A1 | 10/2011 | Lee et al. |
| 2011/0263757 A1 | 10/2011 | Rand et al. |
| 2011/0306726 A1 | 12/2011 | Bailey et al. |
| 2012/0133073 A1 | 5/2012 | Pacorel et al. |
| 2012/0156954 A1 | 6/2012 | Eckert et al. |
| 2013/0029150 A1 | 1/2013 | Appley et al. |
| 2013/0032749 A1 | 2/2013 | Jaffrennou et al. |
| 2013/0047888 A1 | 2/2013 | Mueller et al. |
| 2013/0059075 A1 | 3/2013 | Appley et al. |
| 2013/0082205 A1 | 4/2013 | Mueller et al. |
| 2013/0174758 A1 | 7/2013 | Mueller |
| 2013/0234362 A1 | 9/2013 | Swift et al. |
| 2013/0236650 A1 | 9/2013 | Swift et al. |
| 2013/0237113 A1 | 9/2013 | Swift et al. |
| 2013/0244524 A1 | 9/2013 | Swift et al. |
| 2014/0091247 A1 | 4/2014 | Jackson et al. |
| 2014/0134909 A1 | 5/2014 | Guo et al. |
| 2014/0357787 A1 | 12/2014 | Jobber et al. |

FOREIGN PATENT DOCUMENTS

| | | |
|---|---|---|
| CA | 1090026 | 11/1980 |
| CA | 2037214 | 9/1991 |
| CA | 2232334 | 11/1998 |
| CA | 2458333 | 12/1999 |
| CA | 2278946 | 1/2000 |
| CA | 2470783 | 12/2004 |
| CN | 1251738 | 5/2000 |
| DE | 1905054 | 8/1969 |
| DE | 4142261 | 6/1993 |
| DE | 4233622 | 4/1994 |
| DE | 4308089 | 9/1994 |
| DE | 102004033561 | 9/2005 |
| DE | 102005023431 | 11/2006 |
| EP | 0044614 A2 | 1/1982 |
| EP | 0099801 | 2/1984 |
| EP | 354023 | 2/1990 |
| EP | 0461995 | 12/1991 |
| EP | 0524518 A2 | 1/1993 |
| EP | 0547819 A2 | 6/1993 |
| EP | 0583086 A1 | 2/1994 |
| EP | 0714754 A2 | 6/1996 |
| EP | 796681 | 9/1997 |
| EP | 0826710 A2 | 3/1998 |
| EP | 856494 | 8/1998 |
| EP | 0873976 A1 | 10/1998 |
| EP | 878135 | 11/1998 |
| EP | 0882756 A2 | 12/1998 |
| EP | 0911361 A1 | 4/1999 |
| EP | 915811 | 5/1999 |
| EP | 936060 | 8/1999 |
| EP | 976866 | 2/2000 |
| EP | 0990729 A1 | 4/2000 |
| EP | 1038433 A1 | 9/2000 |
| EP | 1193288 A1 | 4/2002 |
| EP | 1084167 | 9/2002 |
| EP | 1268702 | 1/2003 |
| EP | 1382642 | 1/2004 |
| EP | 1486547 A2 | 12/2004 |
| EP | 1522642 | 4/2005 |
| EP | 1698598 A1 | 9/2006 |
| EP | 1767566 | 4/2007 |
| EP | 2223941 | 9/2010 |
| EP | 2253663 | 11/2010 |
| FR | 2614388 | 10/1988 |
| GB | 770561 | 3/1957 |
| GB | 809675 | 3/1959 |
| GB | 926749 | 5/1963 |
| GB | 1391172 | 4/1975 |
| GB | 1469331 | 4/1977 |
| GB | 1512066 | 5/1978 |
| GB | 1525541 | 9/1978 |
| GB | 2047258 | 11/1980 |
| GB | 2078805 A | 1/1982 |
| GB | 2173523 | 10/1986 |
| GB | 2251438 | 7/1992 |
| JP | 53113784 | 10/1978 |
| JP | 57101100 | 6/1982 |
| JP | 5811193 | 1/1983 |
| JP | 61195647 | 8/1986 |
| JP | 3-173680 | 7/1991 |
| JP | 05186635 | 7/1993 |
| JP | 7-034023 | 2/1995 |
| JP | 09157627 | 6/1997 |
| JP | 10234314 | 9/1998 |
| JP | 11035491 | 2/1999 |
| JP | 11181690 | 7/1999 |
| JP | 2000327841 | 11/2000 |
| JP | 2002293576 | 9/2002 |
| JP | 2003147276 | 5/2003 |
| JP | 2003238921 | 8/2003 |
| JP | 2004060058 | 2/2004 |
| JP | 2005306919 | 11/2005 |
| NZ | 549563 | 1/2008 |
| RU | 1765996 | 8/1995 |
| SU | 374400 | 3/1973 |
| WO | 1990007541 | 7/1990 |
| WO | 1992012198 | 7/1992 |
| WO | 1995034517 | 12/1995 |
| WO | 1997049646 | 12/1997 |
| WO | 1999036368 | 7/1999 |
| WO | 199947765 | 9/1999 |
| WO | 199960042 | 11/1999 |
| WO | 199960043 | 11/1999 |
| WO | 200058085 | 10/2000 |
| WO | 2001014491 | 3/2001 |
| WO | 2001059026 | 8/2001 |
| WO | 200200429 | 1/2002 |
| WO | 200206178 | 1/2002 |
| WO | 2003029496 | 4/2003 |
| WO | 2003071879 | 9/2003 |
| WO | 2003106561 | 12/2003 |
| WO | 2004007615 | 1/2004 |
| WO | 2004076734 | 9/2004 |
| WO | 2005087837 | 9/2005 |
| WO | 2006044302 | 4/2006 |

(56) References Cited

FOREIGN PATENT DOCUMENTS

| WO | 2006136614 | | 12/2006 |
|---|---|---|---|
| WO | 2007014236 | | 2/2007 |
| WO | 2007024020 | A1 | 3/2007 |
| WO | 2007050964 | | 5/2007 |
| WO | 2007112335 | | 10/2007 |
| WO | 2008089847 | | 7/2008 |
| WO | 2008089851 | | 7/2008 |
| WO | 2008141201 | | 11/2008 |
| WO | 2009019235 | | 2/2009 |
| WO | 2009129084 | | 10/2009 |
| WO | 2010027937 | | 3/2010 |
| WO | 2010139899 | | 12/2010 |
| WO | 2011019590 | | 2/2011 |
| WO | 2011019593 | | 2/2011 |
| WO | 2011019597 | | 2/2011 |
| WO | 2011019598 | | 2/2011 |
| WO | 2011022224 | | 2/2011 |
| WO | 2011022226 | | 2/2011 |
| WO | 2011022227 | | 2/2011 |
| WO | 2011138458 | | 11/2011 |
| WO | 2011138459 | | 11/2011 |
| WO | 2013150123 | | 10/2013 |

OTHER PUBLICATIONS

International Search Report and Written Opinion for PCT/US2008/069046, completed Sep. 25, 2008.
International Search Report and Written Opinion for PCT/EP2011/059317, completed Jul. 15, 2011.
International Search Report for PCT/EP2008/060185, completed Oct. 23, 2008.
International Search Report for PCT/EP2011/057363, completed Sep. 5, 2011.
Ames, J.M., "The Maillard Browning Reaction—an Update, "Chemistry & Industry, No. 17, 1988, 4 pages.
"Gamma-aminopropyltrimethoxysilane, "Hawley's Condensed Chemical Dictionary, 14th Edition, John Wiley & Sons, Inc., 2002, 1 page.
Hodge, J.E., Chemistry of Browning Reactions in Model Systems, 1953, J. Agric. Food Chem., vol. 1, No. 15, pp. 928-943.
Agyei-Aye et al., "The Role of Anion in the Reaction of Reducing Sugars with Ammonium Salts," Carbohydrate Research 2002, 337: 2273-2277.
Laroque et al., "Kinetic study on the Maillard reaction. Consideration of sugar reactivity," Food Chemistry 2008, 111: 1032-1042.
Bjorksten et al., "Polyester Resin—Glass Fiber Laminates," Industrial and Engineering Chemistry (1954).
Dow Corning, "A Guide to Silane Solutions," 2005.
Knauf Data Sheet, 2006.
Molasses Corporation, United States Sugar Corporation, http://www.suga-lik.com/molasses/composition.html (Sep. 29, 2003).
Clamen, Guy, "Acrylic Thermosets: A Safe Alternative to Formaldehyde Resins," Nonwovens World, Apr.-May 2004, pp. 96-102.
Opposition to AU 2006272595, Amended Statement of Grounds and Particulars, issued from Australian Patent Office, Jul. 6, 2012, 22 pages.
Decision re Opposition to AU 2006272595, issued from Australian Patent Office, Aug. 14, 2015, 25 pages.
Opposition to EP 1732968, Notice of Opposition: Prior Art, Scope of the Patent, Reasons for the Opposition, issued from European Patent Office, Mar. 8, 2012, 18 pages.
Decision re Opposition to EP 1732968, issued from the European Patent Office, Nov. 14, 2014, 5 pages.
Opposition to EA 019802, submitted to Eurasian Patent Office on Dec. 26, 2014, 36 pages.
Decision re Opposition to EA 019802, issued by Eurasian Patent Office on Aug. 18, 2015, 15 pages.
Owens Corning Retiree Update: What Goes Around, Comes Around: A tale of Natural Binders, revised Mar. 20, 2013 p. 4.
A.P. Bryant, "The Terminology of Sugars," Industrial and Engineering Chemistry, vol. 26, No. 2, p. 231, Feb. 1934.
Food Flavor Chemistry, p. 162, Mar. 21, 2009 (English Abstract).
Office action for co-pending U.S. Appl. No. 12/524,502 (9 pages)—dated Sep. 21, 2012.
Office action for co-pending U.S. Appl. No. 12/524,502 (9 pages)—dated Apr. 4, 2013.
Office action for co-pending U.S. Appl. No. 12/524,512 (7 pages)—dated Aug. 6, 2012.
Office action for co-pending U.S. Appl. No. 12/524,512 (9 pages)—dated Apr. 1, 2013.
Office action for co-pending U.S. Appl. No. 12/524,512 (14 pages)—dated Nov. 12, 2014.
Office action for co-pending U.S. Appl. No. 12/524,512 (9 pages)—dated Jul. 10, 2015.
Office action for co-pending U.S. Appl. No. 12/524,512 (10 pages)—dated Mar. 23, 2016.
Office action for co-pending U.S. Appl. No. 12/524,512 (13 pages)—dated Oct. 5, 2016.
Office action for co-pending U.S. Appl. No. 12/524,512 (13 pages)—dated Apr. 6, 2018.
Office action for co-pending U.S. Appl. No. 12/524,512 (15 pages)—dated Jan. 17, 2019.
Office action for co-pending U.S. Appl. No. 12/524,469 (7 pages)—dated Jun. 7, 2012.
Office action for co-pending U.S. Appl. No. 12/524,469 (8 pages)—dated Jan. 29, 2013.
Office action for co-pending U.S. Appl. No. 12/524,469 (7 pages)—dated Aug. 20, 2013.
Office action for co-pending U.S. Appl. No. 12/524,469 (9 pages)—dated Jun. 9, 2014.
Office action for co-pending U.S. Appl. No. 12/524,469 (9 pages)—dated Oct. 17, 2014.
Office action for co-pending U.S. Appl. No. 12/524,469 (9 pages)—dated Jul. 23, 2015.
Office action for co-pending U.S. Appl. No. 12/524,539 (13 pages)—dated Jun. 21, 2012.
Office action for co-pending U.S. Appl. No. 12/524,539 (13 pages)—dated Jun. 6, 2013.
Office action for co-pending U.S. Appl. No. 12/524,539 (12 pages)—dated Dec. 17, 2014.
Office action for co-pending U.S. Appl. No. 12/524,539 (7 pages)—dated Jul. 15, 2015.
Office action for co-pending U.S. Appl. No. 12/524,539 (7 pages)—dated Mar. 23, 2016.
Office action for co-pending U.S. Appl. No. 12/524,539 (7 pages)—dated Dec. 29, 2016.
Office action for co-pending U.S. Appl. No. 12/524,522 (4 pages)—dated Oct. 11, 2011.
Office action for co-pending U.S. Appl. No. 12/667,718 (5 pages)—dated Sep. 3, 2013.
Office action for co-pending U.S. Appl. No. 12/667,718 (6 pages)—dated Sep. 9, 2014.
Office action for co-pending U.S. Appl. No. 12/671,922 (10 pages)—dated Oct. 7, 2011.
Office action for co-pending U.S. Appl. No. 12/671,922 (10 pages)—dated May 10, 2012.
Office action for co-pending U.S. Appl. No. 12/671,922 (9 pages)—dated Sep. 23, 2014.
Office action for co-pending U.S. Appl. No. 12/671,922 (5 pages)—dated Apr. 4, 2016.
Office action for co-pending U.S. Appl. No. 13/388,408 (5 pages)—dated Aug. 15, 2013.
Office action for co-pending U.S. Appl. No. 13/371,829 (9 pages)—dated Dec. 20, 2012.
Office action for co-pending U.S. Appl. No. 13/371,829 (6 pages)—dated Jul. 12, 2013.
Office action for co-pending U.S. Appl. No. 13/371,829 (6 pages)—dated Aug. 12, 2014.
Office action for co-pending U.S. Appl. No. 13/637,794 (8 pages)—dated Aug. 12, 2013.
Office action for co-pending U.S. Appl. No. 13/637,794 (9 pages)—dated Mar. 26, 2014.
Office action for co-pending U.S. Appl. No. 13/696,439 (111 pages)—dated Jan. 8, 2014.

(56) References Cited

OTHER PUBLICATIONS

Office action for co-pending U.S. Appl. No. 13/696,452 (7 pages)—dated Jan. 13, 2015.
Office action for co-pending U.S. Appl. No. 13/696,452 (9 pages)—dated Oct. 27, 2015.
Office action for co-pending U.S. Appl. No. 13/702,144 (6 pages)—dated Jan. 10, 2014.
Office action for co-pending U.S. Appl. No. 13/702,144 (7 pages)—dated Jul. 29, 2014.
Office action for co-pending U.S. Appl. No. 13/823,818 (9 pages)—dated Mar. 26, 2015.
Office action for co-pending U.S. Appl. No. 13/866,368 (16 pages)—dated Aug. 29, 2013.
Office action for co-pending U.S. Appl. No. 13/866,368 (11 pages)—dated Apr. 16, 2014.
Office action for co-pending U.S. Appl. No. 13/866,368 (8 pages)—dated Aug. 21, 2014.
Office action for co-pending U.S. Appl. No. 13/866,419 (14 pages)—dated Sep. 20, 2013.
Office action for co-pending U.S. Appl. No. 13/866,419 (10 pages)—dated Apr. 25, 2014.
Office action for co-pending U.S. Appl. No. 13/866,419 (8 pages)—dated Oct. 9, 2014.
Office action for co-pending U.S. Appl. No. 13/866,419 (8 pages)—dated Sep. 25, 2015.
Office action for co-pending U.S. Appl. No. 13/868,233 (23 pages)—dated Aug. 13, 2013.
Office action for co-pending U.S. Appl. No. 13/868,233 (12 pages)—dated Apr. 15, 2014.
Office action for co-pending U.S. Appl. No. 13/868,233 (8 pages)—dated Oct. 7, 2014.
Office action for co-pending U.S. Appl. No. 13/868,233 (8 pages)—dated Jul. 16, 2015.
Office action for co-pending U.S. Appl. No. 13/868,233 (8 pages)—dated Jul. 16, 2014.
Office action for co-pending U.S. Appl. No. 12/976,379 (7 pages)—dated Jan. 10, 2012.
Office action for co-pending U.S. Appl. No. 12/976,379 (6 pages)—dated Jul. 27, 2012.
Office action for co-pending U.S. Appl. No. 12/976,379 (9 pages)—dated Mar. 7, 2013.
Office action for co-pending U.S. Appl. No. 12/976,379 (8 pages)—dated Aug. 20, 2013.
Office action for co-pending U.S. Appl. No. 12/599,858 (8 pages)—dated May 11, 2011.
Office action for co-pending U.S. Appl. No. 13/341,542 (8 pages)—dated Dec. 26, 2012.
Office action for co-pending U.S. Appl. No. 13/341,542 (7 pages)—dated Feb. 10, 2014.
Office action for co-pending U.S. Appl. No. 14/026,394 (6 pages)—dated Aug. 14, 2014.
Office action for co-pending U.S. Appl. No. 14/272,556 (14 pages)—dated Nov. 20, 2014.
Office action for co-pending U.S. Appl. No. 14/272,556 (12 pages)—dated Sep. 17, 2015.
Office action for co-pending U.S. Appl. No. 14/342,069 (17 pages)—dated Dec. 29, 2015.
Office action for co-pending U.S. Appl. No. 14/342,069 (22 pages)—dated Sep. 2, 2016.
Office action for co-pending U.S. Appl. No. 14/342,069 (21 pages)—dated Sep. 26, 2017.
Office action for co-pending U.S. Appl. No. 14/342,069 (21 pages)—dated Jun. 6, 2018.
Office action for co-pending U.S. Appl. No. 14/649,277 (9 pages)—dated Jul. 22, 2016.
Office action for co-pending U.S. Appl. No. 14/686,915 (8 pages)—dated Nov. 18, 2016.
Office action for co-pending U.S. Appl. No. 14/810,765 (7 pages)—dated Jan. 29, 2016.
Office action for co-pending U.S. Appl. No. 14/828,916 (8 pages)—dated Nov. 25, 2016.
Office action for co-pending U.S. Appl. No. 14/867,502 (9 pages)—dated Nov. 18, 2016.
Office action for co-pending U.S. Appl. No. 15/172,432 (16 pages)—dated Apr. 17, 2017.
Office action for co-pending U.S. Appl. No. 15/702,087 (5 pages)—dated Nov. 9, 2018.
Office action for co-pending U.S. Appl. No. 15/177,442 (17 pages)—dated May 19, 2017.
Office action for co-pending U.S. Appl. No. 15/378,159 (18 pages)—dated Mar. 2, 2017.
Office action for co-pending U.S. Appl. No. 15/222,122 (8 pages)—dated Nov. 20, 2017.
Office action for co-pending U.S. Appl. No. 15/310,837 (13 pages)—dated Jun. 21, 2018.
Office action for co-pending U.S. Appl. No. 15/411,972 (9 pages)—dated Mar. 28, 2017.
Office action for co-pending U.S. Appl. No. 15/411,972 (8 pages)—dated Nov. 29, 2017.
Office action for co-pending U.S. Appl. No. 15/411,972 (9 pages)—dated Jun. 14, 2018.
Office action for co-pending U.S. Appl. No. 15/166,254 (8 pages)—dated Apr. 26, 2018.
Office action for co-pending U.S. Appl. No. 15/116,254 (10 pages)—dated Aug. 15, 2018.
Office action for co-pending U.S. Appl. No. 15/333,670 (5 pages)—dated Dec. 8, 2017.
Office action for co-pending U.S. Appl. No. 14/116,048 (10 pages)—dated Jun. 23, 2017.
Office action for co-pending U.S. Appl. No. 15/959,131 (8 pages)—dated Nov. 8, 2019.
Office action for co-pending U.S. Appl. No. 15/822,102 (6 pages)—dated Dec. 6, 2019.
Office action for co-pending U.S. Appl. No. 15/690,623 (6 pages)—dated Jan. 9, 2020.
Other Information—Narrative of verbal disclosure of Brian Swift (1 page)—May 13, 2014.
Petition for Inter Partes Review of U.S. Pat. No. 8,114,210 (52 pages, filed Jun. 12, 2015 by Petitioners Johns Manville Corporation and Johns Manville, Inc.).
Declaration of Dr. Frederick J. Hirsekorn Regarding U.S. Pat. No. 8,114,210 (58 pages, filed Jun. 12, 2015 by Petitioners Johns Manville Corporation and Johns Manville, Inc. in connection with Petition for Inter Partes Review of U.S. Pat. No. 8,114,210).
1st Petition for Inter Partes Review of U.S. Pat. No. D631,670 (68 pages, filed Jun. 19, 2015 by Petitioners Johns Manville Corporation and Johns Manville, Inc.).
2nd Petition for Inter Partes Review of U.S. Pat. No. D631,670 (62 pages, filed Nov. 2, 2015 by Petitioners Johns Manville Corporation and Johns Manville, Inc.).
Decision of PTAB regarding Institution of Inter Partes Review for U.S. Pat. No. D631,670 (33 pages)—Jan. 12, 2016.
Decision2 of PTAB regarding Institution of Inter Partes Review for U.S. Pat. No. D631,670 (27 pages)—May 9, 2016.
Final Written Decision of PTAB regarding Inter Partes Review of U.S. Pat. No. D631,670 based on 1st Petition (56 pages)—Jan. 11, 2017.
Final Written Decision of PTAB regarding Inter Partes Review of U.S. Pat. No. D631,670 based on 2nd Petition (55 pages)—May 8, 2017.
Court of Appeals for Federal Circuit Judgment from Appeal of PTAB Decisions in Inter Partes Reviews of U.S. Pat. No. D631,670 (2 pages)—Jul. 13, 2018.
1st Petition for Inter Partes Review of U.S. Pat. No. 8,940,089 (61 pages, filed Jul. 1, 2015 by Petitioners Johns Manville Corporation and Johns Manville, Inc.).
Declaration of Dr. Frederick J. Hirsekorn Regarding U.S. Pat. No. 8,940,089 (70 pages, filed Jul. 1, 2015 by Petitioners Johns Manville Corporation and Johns Manville, Inc. in connection with 1st Petition f or Inter Partes Review of U.S. Pat. No. 8,940,089).

(56) References Cited

OTHER PUBLICATIONS

2nd Petition for Inter Partes Review of U.S. Pat. No. 8,940,089 (56 pages, filed Jul. 10, 2015 by Petitioners Johns Manville Corporation and Johns Manville, Inc.).
Declaration of Dr. Frederick J. Hirsekorn Regarding U.S. Pat. No. 8,940,089 (67 pages, filed Jul. 10, 2015 by Petitioners Johns Manville Corporation and Johns Manville, Inc. in connection with 2nd Petition for Inter Partes Review of U.S. Pat. No. 8,940,089).
3rd Petition for Inter Partes Review of U.S. Pat. No. 8,940,089 (62 pages, filed Jul. 17, 2015 by Petitioners Johns Manville Corporation and Johns Manville, Inc.).
Declaration of Dr. Frederick J. Hirsekorn Regarding U.S. Pat. No. 8,940,089 (76 pages, filed Jul. 17, 2015 by Petitioners Johns Manville Corporation and Johns Manville, Inc. in connection with 3rd Petition for Inter Partes Review of U.S. Pat. No. 8,940,089).
Declaration of Dr. Elam Leed (11 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
Declaration of Dr. Jonathan Vickers (10 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
1st Petition for Inter Partes Review of U.S. Pat. No. 9,039,827 (60 pages, filed Jul. 29, 2015 by Petitioners Johns Manville Corporation and Johns Manville, Inc.).
Declaration of Dr. Frederick J. Hirsekorn Regarding U.S. Pat. No. 9,039,827 (72 pages, filed Jul. 29, 2015 by Petitioners Johns Manville Corporation and Johns Manville, Inc. in connection with $1^{st}$ Petition for Inter Partes Review of U.S. Pat. No. 9,039,827).
2nd Petition for Inter Partes Review of U.S. Pat. No. 9,039,827 (51 pages, filed Aug. 5, 2015 by Petitioners Johns Manville Corporation and Johns Manville, Inc.).
Declaration of Dr. Frederick J. Hirsekorn Regarding U.S. Pat. No. 9,039,827 (65 pages, filed Aug. 5, 2015 by Petitioners Johns Manville Corporation and Johns Manville, Inc. in connection with $2^{nd}$ Petition for Inter Partes Review of U.S. Pat. No. 9,039,827).
3rd Petition for Inter Partes Review of U.S. Pat. No. 9,039,827 (57 pages, filed Aug. 7, 2015 by Petitioners Johns Manville Corporation and Johns Manville, Inc.).
Declaration of Dr. Frederick J. Hirsekorn Regarding U.S. Pat. No. 9,039,827 (75 pages, filed Aug. 7, 2015 by Petitioners Johns Manville Corporation and Johns Manville, Inc. in connection with $3^{rd}$ Petition for Inter Partes Review of U.S. Pat. No. 9,039,827).
Declaration of Dr. Elam Leed (11 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Declaration of Dr. Jonathan Vickers (10 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Petition for Inter Partes Review of U.S. Pat. No. 9,469,747 (67 pages, filed Mar. 20, 2018 by Petitioners Johns Manville Corporation and Johns Manville, Inc.).
Petition for Inter Partes Review of U.S. Pat. No. 9,828,287 (86 pages, filed Mar. 23, 2018 by Petitioners Johns Manville Corporation and Johns Manville, Inc.).
Petition for Inter Partes Review of U.S. Pat. No. 9,464,207 (78 pages, filed Mar. 28, 2018 by Petitioners Johns Manville Corporation and Johns Manville, Inc.).
Petition for Inter Partes Review of U.S. Pat. No. 9,926,464 (74 pages, filed Mar. 30, 2018 by Petitioners Johns Manville Corporation and Johns Manville, Inc.).
Final Rejection in Ex Parte Reexamination of U.S. Pat. No. 7,888,445 (20 pages)—Jul. 24, 2015.
Final Rejection in Ex Parte Reexamination of U.S. Pat. No. 7,772,347 (23 pages)—Jul. 24, 2015.
Final Rejection in Ex Parte Reexamination of U.S. Pat. No. 7,854,980 (31 pages)—Aug. 18, 2015.
Advisory Action in Ex Parte Reexamination of U.S. Pat. No. 7,888,445 (4 pages)—Oct. 6, 2015.
Advisory Action in Ex Parte Reexamination of U.S. Pat. No. 7,772,347 (4 pages)—Oct. 6, 2015.
Advisory Action in Ex Parte Reexamination of U.S. Pat. No. 7,854,980 (4 pages)—Nov. 18, 2015.
Examiner's Answer in Ex Parte Reexamination of U.S. Pat. No. 7,888,445 (8 pages)—Mar. 23, 2016.
Examiner's Answer in Ex Parte Reexamination of U.S. Pat. No. 7,772,347 (8 pages)—Mar. 23, 2016.
Examiner's Answer in Ex Parte Reexamination of U.S. Pat. No. 7,854,980 (8 pages—Mar. 22, 2016.
Decision of PTAB in Ex Parte Reexamination of U.S. Pat. No. 7,888,445 (17 pages)—Sep. 29, 2016.
Decision of PTAB in Ex Parte Reexamination of U.S. Pat. No. 7,772,347 (18 pages)—Sep. 29, 2016.
Decision of PTAB in Ex Parte Reexamination of U.S. Pat. No. 7,854,980 (22 pages)—Sep. 30, 2016.
Court of Appeals for Federal Circuit Judgment from Consolidated Appeal of PTAB Decisions in Ex Parte Reexamination of U.S. Pat. Nos. 7,888,445, 7,772,347 and 7,854,980 (5 pages)—Mar. 9, 2018.
Notice of Intent to Issue Ex Parte Reexamination Certificate for U.S. Pat. No. 7,772,347 (4 pages)—Oct. 24, 2018.
Notice of Intent to Issue Ex Parte Reexamination Certificate for U.S. Pat. No. 7,888,445 (4 pages)—Dec. 7, 2018.
Decision of USPTO to Reopen Prosecution in Ex Parte Reexamination of U.S. Pat. No. 7,854,980 (7 pages)—Jan. 7, 2019.
Non-final Office Action from Reopened Prosecution in Ex Parte Reexamination of U.S. Pat. No. 7,854,980 (26 pages)—Apr. 3, 2019
Final Office Action from Reopened Prosecution in Ex Parte Reexamination of U.S. Pat. No. 7,854,980 (11 pages)—Aug. 8, 2019
Notice of Intent to Issue Ex Parte Reexamination Certificate for U.S. Pat. No. 7,854,980 (3 pages)—Oct. 29, 2019.
Notice of Intent to Issue Inter Partes Reexamination Certificate for U.S. Pat. No. 7,807,771 (4 pages)—Jan. 30, 2014.
Notice of Intent to Issue Inter Partes Reexamination Certificate for U.S. Pat. No. 7,854,980 (6 pages)—Aug. 31, 2017.
Decision of PTAB in Inter Partes Reexamination of U.S. Pat. No. 7,888,445 (34 pages)—May 1, 2015.
Decision of PTAB in Inter Partes Reexamination of U.S. Pat. No. 7,772,347 (36 pages)—May 1, 2015.
Decision of PTAB in Inter Partes Reexamination of U.S. Pat. No. 7,854,980 (25 pages)—Jul. 30, 2015.
Remand Order of PTAB in Inter Partes Reexamination of U.S. Pat. No. 7,888,445 (5 pages)—Dec. 9, 2015.
Remand Order of PTAB in Inter Partes Reexamination of U.S. Pat. No. 7,772,347 (5 pages)—Dec. 9 , 2015.
Examiner's Determination on Patent Owner Response/Requester Comments after Board Decision in Inter Partes Reexamination of U.S. Pat. No. 7,888,445 (22 pages) 'Oct. 17, 2016.
Examiner's Determination on Patent Owner Response/Requester Comments after Board Decision in Inter Partes Reexamination of U.S. Pat. No. 7,772,347 (17 pages)—Oct. 17, 2016.
Court of Appeals for Federal Circuit Opinion/Judgment from Appeal of PTAB Decision in Inter Partes Reexamination of U.S. Pat. No. 7,854,980 (13 pages)—Feb. 27, 2017.
Final Decision of PTAB in Inter Partes Reexamination of U.S. Pat. No. 7,888,445 (25 pages)—Sep. 8, 2017.
Final Decision of PTAB in Inter Partes Reexamination of U.S. Pat. No. 7,772,347 (24 pages)—Sep. 8, 2017.
Decision of PTAB re Request for Rehearing in Inter Partes Reexamination of U.S. Pat. No. 7,888,445 (7 pages)—Feb. 12, 2018.
Decision of PTAB re Request for Rehearing in Inter Partes Reexamination of U.S. Pat. No. 7,772,347 (7 pages)—Feb. 12, 2018.
Court of Appeals for Federal Circuit Decision re Consolidated Appeal of PTAB Decision in Inter Partes Reexamination of U.S. Pat. No. 7,772,347 and U.S. Pat. No. 7,888,445 (14 pages)—Oct. 15, 2019.
Decision of PTAB regarding Institution of Inter Partes Review for U.S. Pat. No. 8,114,210 (20 pages)—Oct. 21, 2015.
Final Written Decision of PTAB regarding Inter Partes Review of U.S. Pat. No. 8,114,210 (39 pages)—Oct. 19, 2016.

(56) References Cited

OTHER PUBLICATIONS

Court of Appeals for Federal Circuit Judgment from Appeal of PTAB Decision in Inter Partes Review of U.S. Pat. No. 8,114,210 (5 pages)—Jan. 16, 2018.
Petition for Ex Parte Re-examination of U.S. Pat. No. 8,114,210 (66 pages, filed Feb. 27, 2020 by Petitioners Johns Manville Corporation and Johns Manville, Inc.).
Decision1 of PTAB declining Institution of Inter Partes Review for U.S. Pat. No. 8,940,089 (16 pages)—Dec. 17, 2015.
Decision2 of PTAB declining Institution of Inter Partes Review for U.S. Pat. No. 8,940,089 (19 pages)—Dec. 17, 2015.
Decision3 of PTAB declining Institution of Inter Partes Review for U.S. Pat. No. 8,940,089 (14 pages)—Dec. 17, 2015.
Decision1 of PTAB declining Institution of Inter Partes Review for U.S. Pat. No. 9,039,827 (16 pages)—Jan. 4, 2016.
Decision2 of PTAB declining Institution of Inter Partes Review for U.S. Pat. No. 9,039,827 (19 pages)—Jan. 4, 2016.
Decision3 of PTAB declining Institution of Inter Partes Review for U.S. Pat. No. 9,039,827 (14 pages)—Jan. 4, 2016.
Decision of PTAB denying Institution of Inter Partes Review for U.S. Pat. No. 9,926,464 (29 pages)—Oct. 2, 2018.
Decision of PTAB denying Institution of Inter Partes Review for U.S. Pat. No. 9,464,207 (28 pages)—Oct. 2, 2018.
Decision of PTAB denying Institution of Inter Partes Review for U.S. Pat. No. 9,469,747 (29 pages)—Oct. 3, 2018.
Decision of PTAB denying Institution of Inter Partes Review for U.S. Pat. No. 9,828,287 (22 pages)—Oct. 16, 2018.
Statement of Revocation Grounds re GB2496951—Claimant Rockwool International (May 21, 2018, 22 pages).
Statement of Revocation Grounds re GB2451719—Claimant Rockwool International (May 18, 2018, 22 pages).
Expert Report re Revocation of GB2451719 and GB2496951—Claimant Rockwool International (Nov. 12, 2018, 11 pages).
United Kingdom Intellectual Property Office, Decision in *Rockwool International* v. *Knauf Insulation Limited*, Application under Section 72 for revocation of patents GB2451719 and GB2496951 (May 28, 2019—18 pages).
Decision of EPO Board of Appeal re Added Matter vis-à-vis EP06788492.4 (Jul. 17, 2019—14 pages).
File Wrapper re U.S. Pat. No. 2,965,504—Part 1 (10 pages).
File Wrapper re U.S. Pat. No. 2,965,504—Part 2 (14 pages).
File Wrapper re U.S. Pat. No. 2,965,504—Part 3 (14 pages).
Gogek Attorney Comments re U.S. Pat. No. 2,965,504—Apr. 6, 1960 (3 pages).
Gogek Affidavit Under Rule 132 re U.S. Pat. No. 2,965,504—Feb. 26, 1960 (3 pages).
Viswanathan, T., "Chapter 28: Thermosetting Adhesive Resins from Whey and Whey Byproducts," in Adhesives from Renewable Resources, ACS Symposium Series, Hemingway, R.W., et al. (Eds.), American Chemical Society, Washington, DC (1989).
Viswanathan, T., and Richardson, T., "Thermosetting Adhesive Resins from Whey and Whey Byproducts," Ind. Eng. Chem. Prod. Res. Dev. 23:644-47, American Chemical Society, United States (1984).
Residential Energy Conservation: vol. 1, Congress of the U.S., Office of Technology Assessment (Ed.), 357 pages (Jan. 1, 1979).
Office Action Granting Ex Parte Reexamination of U.S. Pat. No. 7,888,445, dated Dec. 24, 2013, in Control No. 90/013,029, 11 pages.
Office Action Granting Ex Parte Reexamination of U.S. Pat. No. 7,772,347, dated Dec. 24, 2013, in Control No. 90/013,030, 14 pages.
Office Action Granting Ex Parte Reexamination of U.S. Pat. No. 7,854,980, dated Apr. 15, 2014, in Control No. 90/013,156, 20 pages.
Declaration of Jan Rud Andersen submitted in Ex parte Reexamination Control No. 90/013,030, as Document OTH-C, Oct. 10, 2013, 4 pages.
Remand Order of PTAB in Inter Partes Reexamination of U.S. Pat. No. 7,888,445 (3 pages)—Jul. 1, 2020.
Remand Order of PTAB in Inter Partes Reexamination of U.S. Pat. No. 7,772,347 (3 pages)—Jul. 1, 2020.
Decision of USPTO Granting Ex Parte Re-exam of U.S. Pat. No. 8,114,210 (11 pages)—Apr. 9, 2020.
Decision of USPTO Granting Ex Parte Re-exam of U.S. Pat. No. 9,828,287 (13 pages)—Jul. 17, 2020.
Decision of USPTO Granting Ex Parte Re-exam of U.S. Pat. No. 9,464,207 (14 pages)—Jul. 31, 2020.
Decision of USPTO Granting Ex Parte Re-exam of U.S. Pat. No. 9,926,464 (18 pages)—Aug. 5, 2020.
Decision of USPTO Granting Ex Parte Re-exam of U.S. Pat. No. 8,940,089 (17 pages)—Oct. 16, 2020.
Decision of USPTO Granting Ex Parte Re-exam of U.S. Pat. No. 9,039,827 (16 pages)—Oct. 16, 2020.
Decision of USPTO Granting Ex Parte Re-exam of U.S. Pat. No. 9,469,747 (16 pages)—Nov. 9, 2020.

* cited by examiner

FIBER PRODUCTS HAVING TEMPERATURE CONTROL ADDITIVES

CROSS-REFERENCE TO RELATED APPLICATIONS

This application is a continuation of U.S. application Ser. No. 15/222,122, filed Jul. 28, 2016, which is a continuation of U.S. application Ser. No. 14/810,765 (now abandoned), filed Jul. 28, 2015, which is a continuation of U.S. application Ser. No. 13/702,144, filed Dec. 5, 2012, which is a national stage entry under 35 USC § 371(b) of International Application No. PCT/EP2011/059317, filed Jun. 6, 2011, which claims the benefit under 35 U.S.C § 119(e) of U.S. Provisional Application Ser. No. 61/352,070, filed on Jun. 7, 2010, the disclosures of each of which are incorporated by reference in their entirety.

TECHNICAL FIELD

This disclosure relates to a fiber product comprising fibers and a binder and materials made therewith. In particular, a product that includes loosely assembled fibers, a binder, and a temperature control additive is described.

BACKGROUND

Fiber products may include fibers and a binder material. Binders are useful in fabricating fiber products because they are capable of consolidating non- or loosely-assembled matter. For example, binders enable two or more surfaces to become united. For example, thermosetting binders may be used to produce fiber products. Thermosetting binders may be characterized by being transformed into insoluble and infusible materials by means of either heat or catalytic action. Examples of a thermosetting binder include a variety of phenol-aldehyde, urea-aldehyde, melamine-aldehyde, and other condensation-polymerization materials like polyfurane and polyurethane resins. Binder compositions containing phenol-aldehyde, resorcinol-aldehyde, phenol/aldehyde/urea, phenol/melamine/aldehyde, and the like are used for the bonding of fibers, textiles, plastics, rubbers, and many other materials.

The mineral wool and fiber board industries have historically used a phenol formaldehyde binder to bind fibers. Phenol formaldehyde type binders provide suitable properties to the final products; however, environmental considerations have motivated the development of alternative binders. One such alternative binder is a carbohydrate based binder derived from reacting a carbohydrate and a multiprotic acid, for example, U.S. Published Application No. 2007/0027283 and Published PCT Application WO2009/019235. Another alternative binder is the esterification products of reacting a polycarboxylic acid and a polyol, for example, U.S. Published Application No. 2005/0202224. Because these binders do not utilize formaldehyde as a reagent, they have been collectively referred to as formaldehyde-free binders.

One manner in which the alternative binder formulations differ from the traditionally used phenol formaldehyde type binders is that the curing reaction conditions vary across the range of binder compositions. It has been observed that some alternative binder formulations require higher temperatures to elicit curing. Still other formulations release more heat during curing (i.e. the curing reaction is more exothermic). A remaining challenge is the absence of a single binder composition which can be used across the entire range of products in the building and automotive sector (e.g. fiberglass insulation, particle boards, office panels, and acoustical sound insulation).

SUMMARY

According to the present disclosure, a fiber product is described which includes fibers and a binder. The fiber product has properties that make it useful for a variety of applications. The fibers may be glass fibers and the product may be a fiberglass insulation product for use in buildings, vehicles, or other structures for acoustic and/or thermal insulation. The fibers may be cellulosic fibers and the product may be a wood board product.

In illustrative embodiments, a fiber product comprises a binder, a collection of fibers, and a particulate additive, wherein the binder is disposed upon the collection of fibers and the particulate additive is distributed within the fiber product. In further illustrative embodiments, a mineral fiber insulation product comprises a binder, a collection of mineral fibers, and a particulate selected from the group consisting of magnesia, alumina, silica, and calcined gypsum. In one embodiment, the fiber product is a mineral fiber product and the particulate is in contact with the mineral fiber product.

In illustrative embodiments, an uncured fiber product comprises an uncured binder, a collection of fibers, and a temperature control additive. In one embodiment, the uncured binder is disposed upon the collection of fibers and the temperature control additive is a particulate and is in contact with the fiber product. In another embodiment, the temperature control additive is selected from a group consisting of aluminum hydroxide, magnesium hydroxide, silicate hydrates, and calcium sulfate dihydrate.

In illustrative embodiments, a method of curing a binder having a temperature control additive comprises heating an uncured binder to a temperature within a predetermined temperature range, the temperature range being high enough to cure the binder but low enough so as to not burn the binder. The uncured binder is maintained at the temperature within the predetermined temperature range for a time sufficient to substantially cure the binder. At a time when the binder is at an elevated temperature, the temperature control additive undergoes an endothermic process so that the binder maintains a safe temperature throughout the curing process. In one embodiment, the predetermined temperature range is from about 100° C. to about 350° C. In another embodiment, the predetermined temperature range is from about 170° C. to about 300° C. In yet another embodiment, the predetermined temperature range has as its lower boundary a temperature sufficient to initiate a curing reaction. In another embodiment, the predetermined temperature range has as its upper boundary a temperature that the binder undergoes combustion. In one embodiment, the temperature control additive undergoes an endothermic process comprising decomposition, dehydration, or a phase transition. In another embodiment, the temperature control additive undergoes an endothermic process consuming about 200 calories per gram of the particulate temperature control additive.

In illustrative embodiments, a method of manufacturing an insulation product comprises contacting a collection of fibers with a binder to form an uncured insulation product, contacting the collection of fibers with a temperature control additive, shaping the uncured insulation product into a configuration adapted for an insulating purpose, and applying an amount of energy to the uncured insulation product, the amount of energy sufficient to initiate an exothermic process. In one embodiment, the exothermic process is the chemical reaction that transitions the binder from an uncured state to a cured state. The product is maintained at an elevated temperature for a time sufficient to cure the binder. In one embodiment, the method further includes forming a dispersion comprising the binder and the temperature control additive, wherein contacting the collection of fibers with the binder and contacting the collection of fibers with the temperature control additive occur concurrently through contacting the collection of fibers with the dispersion including the binder and the temperature control additive. In one embodiment, forming the dispersion includes adding a surfactant. In another embodiment, the method further comprises forming an aqueous dispersion of the temperature control additive and a surfactant, wherein contacting the collection of fibers with the temperature control additive occurs subsequently to contacting the collection of fibers with the binder. In yet another embodiment, contacting the collection of fibers with the temperature control additive includes sprinkling the temperature control additive onto the uncured insulation product, the temperature control additive being in the form of a dry powder or concentrated slurry.

DETAILED DESCRIPTION

Figure 1:
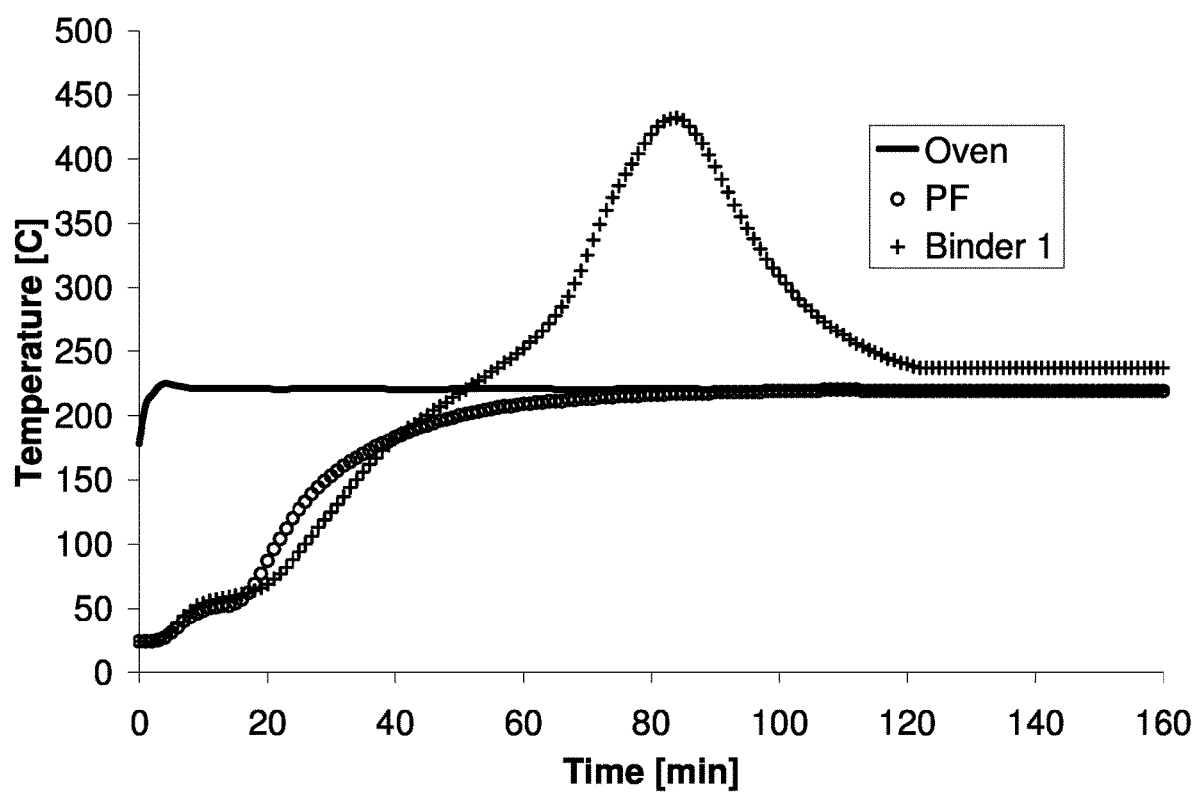
FIG. 1 shows the temperature profiles inside a curing fibrous product as a function of time for an illustrative carbohydrate-based binder product and a comparable phenol formaldehyde based binder product.

While the invention is susceptible to various modifications and alternative forms, specific embodiments will herein be described in detail. It should be understood, however, that there is no intent to limit the invention to the particular forms described, but on the contrary, the intention is to cover all modifications, equivalents, and alternatives falling within the spirit and scope of the invention.

In the manufacture of fiber products, a binder may be disposed onto fibers, such as mineral fibers or cellulosic fibers. The binder adheres to the loosely assembled fibers and causes the fibers to stick to each other. The collection of the fibers consolidated with binder forms a fiber product. A binder in its uncured state is made up of various chemicals capable of reacting with each other to form a polymer. Even when uncured, this binder promotes adhesion between the fibers. However, the physical properties, such as strength, of the binder are enhanced through a curing step. Curing involves reacting the chemicals together to form a polymer. The polymer is strong and has many desirable physical properties. These binder properties provide a fiber product, such as residential fiberglass insulation, with the properties to which consumers are accustomed. A fiber product having a binder in the uncured state may be used in further manufacturing. For example, the fiber product may be packaged, sold, and shipped to a customer that uses the product in the manufacture of another good. For example, the uncured product can be sold to molders who use cure the fiber product in a mold with a particular shape for a particular purpose. In another example, the uncured product may be stored and later cured in a distinct process by the original manufacturer.

Uncured binders can be cured. For example, the process of manufacturing a cured fiber product may include a step in which heat is applied to the uncured product to cause a chemical reaction. For example, in the case of making fiberglass insulation products, after the binder solution has been applied to the fibers and dehydrated, the uncured insulation product may be transferred to a curing oven. In the curing oven the uncured insulation product is heated (e.g., from about 300° F. to about 600° F. [from about 150° C. to about 320° C.]), causing the binder to cure. As disclosed herein, the cured binder is a formaldehyde-free, water-resistant binder that binds fibers of the product together. Note that the drying and thermal curing may occur either sequentially, simultaneously, contemporaneously, or concurrently.

The curing reactions are typically initiated by heating the insulation product. Once the reaction has started, most curing reactions release energy in the form of heat. An exothermic process is one which releases energy, usually in the form of heat, during the process. An endothermic process is a process which consumes energy, usually in the form of heat, during the process. As such, heat is added to the product to initiate curing and then the exothermic curing reaction provides for the further release of heat. One aspect of the present disclosure is that a temperature control additive is used to control the temperature of the fiber product during an exothermic curing reaction.

As the exothermic curing reaction releases energy in the form of heat, the binder and the product incorporating the binder have a tendency to get hotter. That is, the heat released by the exothermic process may be retained by the binder or the product. Retention of heat will generally cause the temperature of the binder and product to increase. This process may be referred to as self-heating because it is the binder's release of heat which is increasing the temperature of the binder. Self-heating may be a benefit. Since many binder curing reactions are run at elevated temperatures (compared to ambient), a source of heat is required. For example, the heat is often provided by an oven or a heated platen. Self-heating may be beneficial when it facilitates curing the binder with a lower external heat requirement. For example, it may be possible to run the platen or curing ovens at lower temperatures if the binder self-heats. This will result in an energy cost savings. However, self-heating can also be detrimental to manufacturing processes. For example, if the temperature of the insulation product becomes too high, the binder can be damaged or even catch on fire. Furthermore, self-heating may facilitate decreased manufacturing cycle times. As a product self-heats, residency within heat source is no longer needed to maintain conditions satisfactory to curing (i.e. maintaining a temperature sufficient for curing). Thus, a product with extensive self-heating may require a shorter heating cycle. Similarly, the rate of chemical reaction for a binder is related to the temperature. This relationship is known to loosely follow the Arrhenius equation. As such, self-heating increases the temperature of the product beyond that provided by the oven or platen. The increase in temperature increases the curing reaction rates as would be expected from the Arrhenius equation. Thus, curing proceeds more quickly in systems that exhibit self-heating than it does in systems where self-heating does not occur.

If self-heating increases the temperature of a product to the point where oxidative processes commence, the self-heating may cause significant damage to the product. For example, flameless combustion or oxidation may occur when the temperature of the insulation product exceeds about 425° C. At these temperatures, the exothermic combustion or oxidation processes promote further self-heating and the binder may be destroyed. Furthermore, the temperature may increase to a level in which fusing or devitrification of the glass fibers is possible. Not only does this damage the structure and value of the insulation product, it may also create a fire hazard. The self-heating effect may be exacerbated by the density, thickness, and binder content of a particular product. Self-heating may also be more evident in binder systems exhibiting larger enthalpic changes as a result of the curing reaction.

Deleterious self-heating occurs when the heat introduced into the insulation product, in combination with the heat generated through the exothermic curing reaction, causes the temperature of the insulation product to reach a level that has detrimental effects on one or more of the insulation product components. Deleterious self-heating may be particularly problematic in insulation products having high insulating capacity. Insulation materials having high fiberglass density, high binder density, or a combination thereof may have an elevated tendency to exhibit deleterious self-heating. Similarly, insulation products have large physical dimensions, in particular thickness, may have an elevated tendency to deleteriously self-heat. One aspect of deleterious self-heating is that heat generated by the exothermic curing reactions may be contained within the insulation product due to the insulation products capacity to retard heat transfer. Accordingly, one aspect of the present disclosure is that products having high insulative capacity (i.e. high R-value products) are particularly susceptible to deleterious self-heating during their manufacture. Another aspect of deleterious self-heating is that self-heating is the result of the exothermic chemical reaction associated with the curing of the binder. Accordingly, insulation products having a greater concentration of binder per unit volume (denser insulation products) may exhibit an enhanced tendency to be damaged by self-heating.

In one aspect, process conditions can strongly affect deleterious self-heating. For example, the manner in which heat or catalytic action is applied to an uncured insulation product to actuate curing can influence whether a particular composition will exhibit deleterious self-heating. In one example, relatively thin fiberglass batts tend not to exhibit deleterious self-heating because they have relatively low insulating material density, relatively low binder concentrations, and heat dissipation enables curing to occur at temperatures that are substantially lower than those which would cause damage to the binder or the insulating fibers. However, other insulation products may be more readily susceptible to deleterious self-heating. For example, fiberglass pipe insulation is susceptible to deleterious self-heating because it is highly insulating, confined to a rather small volume having relatively high density, and has relatively high binder content. Additionally, fiberglass pipe insulation is manufactured on equipment which transforms a substantially dehydrated uncured product into a shaped product and forces air through the material in order to quickly cure the binder. The speed of the process, the lack of moisture in the initial uncured binder, the high insulating capacity, and the high binder content may cause deleterious self-heating of the finished process to be a substantial concern. Molded fibrous products, in particular, are made through processes which are more susceptible to deleterious self-heating.

One practical manufacturing solution to the deleterious self-heating problem is readily ascertainable. The manufacturing process conditions can be modified to avoid the risk of deleterious self-heating. For example, a lower curing temperature could be used to cure the binder. Furthermore, external cooling mechanisms could be installed to force a cool fluid through or around the product. However, these solutions necessitate additional manufacturing burdens which may increase residency times in the manufacturing equipment and reduce the manufacturing rate. In addition these reasons, one skilled in the art would appreciate that the available approaches to preventing deleterious self-heating are compromises which would result in a product and or process with characteristics that are undesirable.

One aspect of the present disclosure is that the temperature control additive increases the homogeneity of curing across the thickness of a manufactured product. One problem encountered in the manufacture fiber products from alternative binder systems was that the homogeneity of the product could exhibit significant variation. For example, curing of the binder in one location, for example in the center of the product, may deviate significantly from curing in another location, for example the edge or face of the product. A lack of homogeneity would also be evident between different locations equivalently situated, for example between two distinct locations on the face of the product. It was speculated that these deviations in binder curing may, at least partially, be the result of varying air resistance through the product in different areas. For example, in a region of increased air resistance, the exothermic self-heating may not be controlled by the flow of isothermic air through the product to the same extent as a region of decreased air resistance. While inhomogeneity in air resistance across the insulation product can be controlled, to a large extent, by control of manufacturing processes, a means of preventing inhomogeneities in curing conditions independent of local variations in air resistance is desirable.

One aspect of the present disclosure is that it may be advantageous to use one binder formulation on a large range of products within a manufacturing facility. To do so, a binder system must be operable within a range of different products and manufacturing processes. As described above, deleterious self-heating is often related to the product and process configuration; thus, using a consistent binder formulation across the range of processes and products may be difficult due to the propensity of some products and processes to exhibit deleterious self-heating. Accordingly, it may be advantageous to have a means of adding a temperature control additive to some products and processes without changing the binder composition. For example, a particularly challenging product or process, one that regularly exhibits deleterious self-heating with a standard binder formulation, may be made compatible with the standard binder formulation by incorporation of a temperature control additive.

One aspect of the present disclosure is that the temperature control additive functions through a mechanism which does not interfere with the binder system chemistry. In one embodiment, the temperature control additive does not chemically react with any of the binder components. In another embodiment, the temperature control additive is added to a fiber product at a point in which binder composition is substantially dry. For example, the temperature control additive may be added to the binder composition while substantially dry and the temperature control additive is added in the form of a powder, the powder will come into contact with the surface of the binder without being completely embedded within the binder. Therefore, the temperature control additive's interaction with the binder, and any chemistry which may occur within, is limited by the process conditions and structure of the product.

In another aspect, the temperature control additive functions through a mechanism which does not negatively interfere with the physical attributes of binder system. For example, the binder has been added to the fibers for the purpose of consolidating the fibers. If the temperature control additive is a substantial portion of the product, comprises particulates that are too large, or consumes too much of the binder on its surface, the binder may not be adequately available for binding the fibers. While this may be compensated by the addition of more binder, this may be undesirable in term of cost or other product performance characteristics. Accordingly, one aspect of the temperature control additive is that it does not substantially interfere or diminish the physical properties of the binder on the fibers. This interference or diminution would be observed through product characteristics being adversely affected for those products which contained a temperature control additive in comparison to those products which do not contain the temperature control additive.

A solution was discovered addressing the foregoing issues. Specifically, it was discovered that adding a temperature control additive to the insulation product prior to curing prevents deleterious self-heating during or after curing and improves the homogeneity of the cured binder. While the nature of temperature control additive is not to be limited by disclosure of a particular example, it was determined that those additives which undergo endothermic changes at temperatures in close proximity (within 20° C.) to the cure temperature are particularly useful. For example, a temperature control additive may release water at a set temperature (i.e. dehydrate); the release being characterized as endothermic. Insulation products manufactured with the temperature control additive did not excessively self-heat and exhibited more homogeneous cure properties. It was also unexpectedly discovered that temperature control additives improve the consistency of the curing across the insulation products.

The temperature control additive of the present disclosure is well-suited for the binder compositions and associated reaction conditions for a number of the newly developed formaldehyde-free binder formulations. For example, the temperature control additive is well-suited for the binder formulations described in U.S. Pat. No. 7,655,711, U.S. Published Patent Application 2007/0123680, and PCT published application WO 2009/019235, the disclosures of which are hereby incorporated by reference in their entirety. One aspect of the present disclosure is that the suitability of combining a particular binder composition and a temperature control additive rests, in part, on the extent to which the binder reaction is exothermic. One aspect of the present disclosure is that many of the formaldehyde-free binder formulations are either more exothermic or require higher temperatures for curing than the traditionally used phenol-formaldehyde chemistries. Since the reactions are more exothermic, they exhibit greater self-heating. Reactions requiring higher curing temperatures must be more closely controlled because even small amounts of self-heating may cause the temperature to rise so that the binder or fibers become damaged.

As used herein, the term binder solution is the solution of chemicals which can be dried to form the uncured binder. As used herein, the term uncured binder is the substantially dehydrated mixture of chemicals which can be cured to form the cured binder. In practice, the uncured binder may be colorless or white to off white sticky substance that is typically water soluble. As used herein, the term cured binder is a polymer which is generally insoluble. The cured binder may have a characteristic brown to black color.

In illustrative embodiments, the binder comprises a reaction product of a carbohydrate and a source of nitrogen. In one embodiment, the binders are derived from Maillard reactions. In another embodiment, the binders comprise melanoidins. In further embodiments, the binders are based on reducing sugars. In one embodiment, the binder comprises a reaction product of a carbohydrate and an amine or polyamine. In further illustrative embodiments, the binder comprises a reaction product of a carbohydrate, a source of nitrogen, and an acid precursor. In one embodiment, the binder comprises a reaction product of a carbohydrate, ammonia, and an inorganic acid precursor. In another embodiment, the binder comprises a reaction product of a carbohydrate, ammonia, and an organic acid precursor. Exemplary inorganic acid precursors include sulfates, phosphates and nitrates. Exemplary organic acid precursors include polycarboxylic acids such as citric acid, maleic acid, tartaric acid, malic acid, or succinic acid. In one embodiment, the source of nitrogen is an amine base; for example, the source of nitrogen may be ammonia, an ammonium salt, or an alkyl diamine.

In illustrative embodiments, the uncured binder includes the substantially dehydrated cured binder precursors. For example, the uncured binder may include the ammonium salts of the organic or inorganic acids. The uncured binder may also include the dried carbohydrate compound, for example, dextrose. The dextrose may be in the form of a hydrate or a salt. In one embodiment, the binder comprises a dried uncured mixture dextrose and diammonium phosphate. In another embodiment, the binder comprises a dried uncured mixture dextrose and diammonium sulfate. In yet another embodiment, binder comprises a dried uncured mixture dextrose and triammonium citrate.

In illustrative embodiments, an uncured fibrous product comprises an uncured binder, a collection of fibers, and a temperature control additive. In one embodiment, the uncured binder is disposed upon the collection of fibers and the temperature control additive is a particulate and is distributed within the fibrous product. In one embodiment, the temperature control additive is aluminum hydroxide, magnesium hydroxide, calcium silicate hydrates, or calcium sulfate dihydrate. In another embodiment, the uncured binder comprises a carbohydrate and an amine base salt of a multiprotic acid. For example, the carbohydrate may be dextrose, xylose, fructose, dihydroxyacetone, or mixtures thereof and the amine base salt of the multiprotic acid may be ammonium citrate, ammonium phosphate, diammonium phosphate or ammonium sulfate. In one embodiment, a collection of fibers comprises from about 61% to about 96% by weight of the uncured fiber product, the temperature control additive comprises from about 1% to about 15% by weight of the uncured fiber product, and the binder comprises from about 3% to about 30% by weight of the uncured of the uncured fiber product. In another embodiment, the fiber product may also include a silicon containing compound, wherein the silicon containing compound is concentrated at an interface between the binder and the fibers and at a second interface between the binder and the temperature control additive.

In illustrative embodiments, the fibers comprise fibers selected from a group consisting of mineral fibers (slag wool fibers, rock wool fibers, or glass fibers), aramid fibers, ceramic fibers, metal fibers, carbon fibers, polyimide fibers, polyester fibers, rayon fibers, and cellulosic fibers. In one embodiment, the fibers are glass fibers and the fibrous product is fiberglass insulation. In another embodiment, the fibers are mineral wool insulation. In another embodiment, the glass fibers are present in the range from about 70% to about 99% by weight. In another embodiment, the collection of matter comprises cellulosic fibers. For example, the cellulosic fibers may be wood shavings, sawdust, wood pulp, or ground wood. In yet another embodiment, the cellulosic fibers may be other natural fibers such as jute, flax, hemp, and straw. In one embodiment, the cellulosic fibers are present in the range from about 65% to about 97% by weight.

As used herein, a temperature control additive is a material that undergoes an endothermic process at a temperature relevant to the binder curing reaction. The temperature control additive may undergo an endothermic process comprising decomposition, dehydration, or a phase transition. Illustratively, the temperature control additive may undergo an endothermic process consuming about 200 calories per gram of the temperature control additive [~840 J/g]. In one embodiment, the temperature control additive is a metal salt hydrate that undergoes an endothermic dehydration.

In illustrative embodiments, the temperature control additive is selected from the group consisting of $Al(OH)_3$, $AlO(OH)$, $Ca(OH)_2$, $Ca_3PO_4 \cdot H_2O$, $CaSO_4 \cdot 2H_2O$, $5CaO \cdot 6SiO_2 \cdot 5H_2O$, $6CaO \cdot 6SiO_2 \cdot H_2O$, $MgSO_4 \cdot 8H_2O$, $MgCO_3 \cdot 3H_2O$, $4Mg(CO_3) \cdot Mg(OH)_2 \cdot 4H_2O$, $Mg(OH)_2$, $MgO \cdot (CO_2)_{(0.96)} \cdot (H_2O)_{(0.30)}$, $Mg_3(PO_4)_2 \cdot 8H_2O$, $NaAlCO_3(OH)_2$, $NaBO_3 \cdot 4H_2O$, $K_3(citrate) \cdot H_2O$, $Ba(acetate)_2 \cdot H_2O$, and $BaB_2O_4 \cdot nH_2O$. Referring now to Table 1, shown is a list of exemplary temperature control additive and the resulting particulate generated upon the temperature control additive being exposed to elevated temperatures. For each example provided, as the temperature control additive is heated, it undergoes an endothermic process.

TABLE 1

| | Temperature Control Additive | Resulting Particulate |
|---|---|---|
| Name | Formula | Formula |
| aluminum hydroxide | $Al(OH)_3$ | $Al_2O_3$, $AlO(OH)$ |
| aluminium oxide hydroxide | $AlO(OH)$ | $Al_2O_3$ |
| calcium hydroxide | $Ca(OH)_2$ | $CaO$ |
| calcium phosphate monohydrate | $Ca_3PO_4 \cdot H_2O$ | $Ca_3PO_4$ |
| calcium sulfate dihydrate | $CaSO_4 \cdot 2H_2O$ | $CaSO_4 \cdot 0.5H_2O$ |
| tobermorite | 5CaO•6SiO2•5H2O | 5CaO•6SiO2•H2O |
| xonotlite | 6CaO•6SiO2•H2O | fractional hydrates |
| magnesium sulfate octahydrate | $MgSO_4 \cdot 8H_2O$ | $MgSO_4 \cdot nH_2O$, where n < 8 |
| magnesium carbonate trihydrate | $MgCO_3 \cdot 3H_2O$ | $MgCO_3$ and/or $MgO$ |
| hydromagnesite | $4Mg(CO_3) \cdot Mg(OH)_2 \cdot 4H_2O$ | $MgCO_3$ and/or $MgO$ |
| magnesium hydroxide | $Mg(OH)_2$ | $MgO$ |
| magnesium carbonate subhydrate | $MgO \cdot (CO_2)_{(0.96)} \cdot (H_2O)_{(0.30)}$ | $MgCO_3$ and/or $MgO$ |
| magnesium phosphate octahydrate | $Mg_3(PO_4)_2 \cdot 8H_2O$ | $Mg_3(PO_4)_2 \cdot nH_2O$, where n < 8 |
| sodium aluminum carbonate hydroxide | $NaAlCO_3(OH)_2$ | $NaAlO_2$ |
| sodium perborate tetrahydrate | $NaBO_3 \cdot 4H_2O$ | $NaBO_3 \cdot H_2O$ |
| potassium citrate monohydrate | $K_3(citrate) \cdot H_2O$ | $K_3(citrate)$ |
| barium acetate | $Ba(acetate)_2 \cdot H_2O$ | $BaCO_3$ |
| barium borate hydrate | $BaB_2O_4 \cdot nH_2O$, where n ≤ 7 | $BaB_2O_4$ |

The endothermic process changes at least a portion of the temperature control additive into what has been described here as a resulting particulate. The resulting particulates shown in Table 1 are not intended to be a complete listing of the various products which may form during the endothermic process; rather, it shows the formula for a primary or significant product. Furthermore, it is noted that several of the resulting particulates are not stable under ambient conditions which include 50% relative humidity. Instead, the resulting particulate may be hygroscopic or otherwise reactive. In some cases, the resulting particulate will reversibly convert back to the temperature control additive at some time after the endothermic process. For example, calcium sulfate dihydrate will dehydrate to form either an anhydrous or hemihydrous (0.5 moles of water) at high temperatures. It is also known that the calcium sulfate dihydrate is thermodynamically more stable under ambient conditions which include room temperature and 50% relative humidity. Thus, the dihydrate will be present at some time after curing.

The present disclosure relates to the use of the temperature control additive to prevent deleterious self-heating during or after curing of the binder. Accordingly, the uncured fiber product will include a temperature control additive and the cured fiber product will include a resulting particulate. One aspect of the present disclosure is that the products described herein are not using the temperature control additive to achieve flame resistance. Specifically, a goal of the present invention is not to obtain a flame resistant fibrous product. Rather, one aspect of the present disclosure is that the cured product will perform in a nearly identical manner to the same cured product which does not include the temperature control additive. The distinction between the product made with the temperature control additive and the product without the temperature control additive is that the manufacturing process will be more controllable and the resulting product will not exhibit the unwanted characteristics of a product that has undergone deleterious self-heating. This may enable the use of higher curing temperatures and shorter cycle times with the temperature control additive because the temperature control additive prevents deleterious self-heating during the manufacturing process. While the temperature control additive is incorporated at a time which primarily advances the purpose of avoiding deleterious self-heating during curing, the resulting particulate or re-hydrated resulting particulate (e.g. calcium sulfate dihydrate described above) may provide a given fibrous product with enhanced flame resistance. Specifically, the fibrous product may exhibit improved performance compared to a fibrous product made without the temperature control additive on flame penetration testing.

In one embodiment, the temperature control additive is a metal hydroxide which decomposes at elevated temperature to release water. For example, the temperature control additive may include aluminum hydroxide ($Al(OH)_3$) or magnesium hydroxide ($Mg(OH)_2$). In another embodiment, the temperature control additive is a compound that undergoes a dehydration and decomposition. For example, the temperature control additive may include hydromagnesite ($4Mg(CO_3) \cdot Mg(OH)_2 \cdot 4H_2O$). Magnesium hydroxide and aluminum hydroxide may be preferred temperature control additives due to their availability and relatively low cost.

Aluminum hydroxide decomposes to form aluminum oxide (alumina, $Al_2O_3$) and releases three moles of water while consuming approximately 280 calories/gram [1172 J/g]. This decomposition is known to occur at approximately 230° C. Magnesium hydroxide decomposes to magnesium oxide (magnesia, MgO) and releases one mole of water while consuming approximately 330 calories/gram [1380 J/g]. The decomposition of magnesium hydroxide occurs at approximately 330° C. The decomposition and dehydration of hydromagnesite proceeds with a dehydration to produce four moles of water at temperatures below 250° C., a decomposition of $Mg(OH)_2$ to produce MgO with the production of one mole of water at temperatures between 250° C. and 350° C., and a decarbonation of $4MgCO_3$ to produce 4MgO and four moles of carbon dioxide at temperatures between 350° C. and 550° C.

In illustrative embodiments embodiment, the temperature control additive includes a magnesium sulfate hydrate ($MgSO_4 \cdot nH_2O$), wherein n is an integer less than or equal to 8. For example, the temperature control additive may be magnesium sulfate octahydrate or heptahydrate. One of ordinary skill in the art will appreciate that the various hydrates of the magnesium sulfate hydrate can be used interchangeably to some extent and the temperature control additive is likely to include several forms. Further, one skilled in the art will appreciate that the enthalpy of dehydration associated with the removal of additional water may differ. As such, one could tailor the performance characteristics of the temperature control additive by varying the ratio of each form of hydrate.

In further illustrative embodiments, the temperature control additive includes a calcium sulfate dihydrate (gypsum, $CaSO_4 \cdot 2H_2O$). The dehydration of gypsum is well known in the art and is known to occur between 100° C. and 150° C. (302° F.). The dehydration is known to comprise a first partial dehydration in which approximately 75% of the hydrated water is lost and a final dehydration which results in anhydrous calcium sulfate. At temperatures over 250° C., the anhydrous form is prevalent. The partially dehydrated calcium sulfate is known as the hemihydrate or calcined gypsum and has a formula of ($CaSO_4 \cdot mH_2O$), wherein m is in the range 0.5 to 0.8. Another aspect of using gypsum as the temperature control additive is that it can return from either the anhydrous or the calcined gypsum for to the dehydrate form through exposure to ambient water vapor levels. Accordingly, an uncured fiber product would include the dihydrate, a recently cured or curing fiber product would include primarily the anhydrous or hemihydrate, and the finished product would include primarily the dihydrate.

In illustrative embodiments, the temperature control additive is a calcium silicate hydrate. As used herein, a calcium silicate hydrate includes those hydrates produced through silicic acid-calcium reaction between a siliceous raw material and a calcareous raw material in the slurry thereof under high temperature and high pressure condition, wherein the siliceous raw material means a material mainly consisting of $SiO_2$ such as silica sand, silica powder, diatomaceous earth, silica fume, feldspar, clay mineral or fly-ash; and the calcareous raw material means a material mainly consisting of CaO such as quick lime or slaked lime. When a slurry made of the siliceous raw material and the calcareous raw material dispersed into water is heated with agitation under pressure, a calcium silicate hydrate such as a tobermorite and/or xonotlite can be formed through silicic acid-calcium reaction in the slurry.

In illustrative embodiments, the temperature control additive is selected from the group consisting of potassium citrate monohydrate ($K_3$(citrate)$\cdot H_2O$), tricalcium phosphate monohydrate ($Ca_3PO_4 \cdot H_2O$), sodium perborate tetrahydrate ($NaBO_3 \cdot 4H_2O$), barium acetate monohydrate (Ba(acetate)$_2$)$\cdot H_2O$) and barium borate dihydrate ($BaB_2O_4 \cdot 2H_2O$), barium borate heptahydrate ($BaB_2O_4 \cdot 6H_2O$). One skilled in the art appreciates that the use of some of these compounds presents some handling and safety concerns which may require an additional treatment step or a final use within a limited and/or specific application. As such, while not optimal in every application, these temperature control additives possess unique chemical properties such that the additive itself or the resulting particulate may provide for specific disadvantages and/or advantages according to some fibrous product applications.

It was also discovered that various compounds could be used together as an effective temperature control additive. For example, in some applications a combination of aluminum hydroxide and calcium sulfate dihydrate are particularly effective at preventing deleterious self-heating during curing. Similarly, a combination of aluminum hydroxide and magnesium hydroxide may be particularly effective in certain applications.

While aluminum hydroxide, magnesium hydroxide, and hydromagnesite have been used previously as a flame retardant and incorporated into plastics as such, the present application can be distinguished from these uses. In particular, the temperature control additive is being incorporated into uncured binder compositions to aid in the curing process. The curing process does not involve the use of direct flames; rather, heat energy is typically applied without flames. As such, the temperature control additive is not used for flame retardancy. During the curing of the product, the temperature control additive is converted to its dehydrated or decomposed state. For example, during curing, aluminum hydroxide is converted into aluminum oxide. Thus, the manufactured fibrous product may not include any temperature control additive because it was entirely consumed during the manufacturing process.

As described herein, one characteristic of a temperature control additive is that it undergoes an endothermic process upon heating. Differential scanning calorimetry (DSC) and thermo-gravimetric analysis (TGA) have been widely applied to study the thermal dehydration and decomposition of various compounds that can be used as temperature control additives. The analytical results established that various grades of particulates may perform with differing efficacy according to the average particle size. Furthermore, the apparent dehydration and decomposition behavior may also be influenced by the analytical procedure used. It was determined that sample size, heating rate, inert gas flow rate and degree to which the pan was sealed could influence the observed results. It was determined that the efficacy of the temperature control additive in the manufacturing process is a function of the particle size and means of incorporating the temperature control additive into the manufacturing process.

In illustrative embodiments, the temperature control additive is a particulate. In one embodiment, the particulate is a fine particulate. For example, the particulate may have a number weighted average particle size of less than about 200 micrometers, 50 micrometers, or 20 micrometers. In another embodiment, the particulate has a number weighted average particle size of between about 5 micrometers and about 200 micrometers. In one embodiment, the uncured fibrous product comprises from about 0.5% to 20% of a temperature control additive. In another embodiment, the uncured fibrous product comprises from about 1% to about 10% of a temperature control additive by weight. One skilled in the art will appreciate that temperature control additives that function through dehydration and/or decomposition may lose significant mass as a result of the dehydration and/or decomposition. Accordingly, the weight of a temperature control additive may be significantly reduced through the curing process such that the cured product may include a much smaller percentage of the resulting particulate. For example, the resulting particulate may comprise from about 0.2 to about 20% of the cured product. As described above, since the temperature control additive may rehydrate in ambient conditions after the curing process is complete, the upper bound of the temperature control additive and the resulting particulate may be the same.

Binder compositions described herein can be used to fabricate a number of different materials. In particular, these binders can be used to produce or promote cohesion in non- or loosely-assembled matter by placing the binder in contact with the matter to be bound. Any number of well known techniques can be employed to place the aqueous binder in contact with the material to be bound. For example, the aqueous binder can be sprayed on (for example during the binding glass fibers) or applied via a roll-coat apparatus.

It was found that the temperature control additive can be added to the binder formulation that is sprayed onto the fibrous products to provide an essentially homogeneous distribution, or it can be applied to the finished, uncured fibrous product, i.e. by applying the additive as a powder or as a dispersion onto the surface of the uncured fibrous product.

The temperature control additives described herein are generally considered insoluble or only slightly soluble in water, thus form dispersions in aqueous solutions. One skilled in the art appreciates that a dispersion is a liquid phase in which a solid phase has been distributed. In one embodiment, the temperature control additive is a monodispersed dispersion. As used herein, a monodispersed dispersion is one in which at least 75% of the weight of the particulate in solution is in the form of single particles in contrast to a solution containing aggregated or coagulated particles. One skilled in the art will appreciate the numerous analytical techniques available to establish the extent to which a dispersion is monodispersed. In one embodiment the dispersion containing the temperature control additive includes a surfactant suitable for dispersing the temperature control additive. One skilled in the art will appreciate that the use of a surfactant may enhance the monodispersity of a dispersion. In one embodiment, the dispersion is prepared through the use of mechanical and/or sonic mixing techniques. For example, one skilled in the art will appreciate that a dispersion of particles within a solution may require the imposition of shear forces on the solution through stirring and/or sonication. The methods described herein include those techniques undertaken to form an appropriate dispersion.

In illustrative embodiments, the temperature control additive is useful for controlling the temperature during a curing step. In one embodiment, a method includes curing the binder by passing the fibrous product through at least one zone of a curing oven or mold press at a temperature within the range 170° C.-300° C. for a time with an oven residence time in the range 30 seconds to 30 minutes.

In illustrative embodiments, a method of curing a binder comprises heating an uncured binder and maintaining the binder temperature within a predetermined temperature range. In one embodiment, the heating includes initiating an exothermic curing reaction. In another embodiment, the maintaining is for a time sufficient and at a temperature sufficient for the uncured binder to substantially cure. In another embodiment, the maintaining includes causing a particulate temperature control additive to undergo an endothermic process, the endothermic process consuming at least a portion of heat generated by the exothermic curing reaction. In one embodiment, heating the uncured binder includes initiating an exothermic curing reaction between a carbohydrate and an amine base salt of a multiprotic acid. In another embodiment, heating the uncured binder includes initiating an exothermic curing reaction between dextrose, xylose, fructose, dihydroxyacetone, or mixtures thereof and ammonium citrate, ammonium phosphate, diammonium phosphate or ammonium sulfate. In another embodiment, the method of curing a binder includes decomposing a hydroxide salt, liberating water. In yet another embodiment, the predetermined temperature range is from about 100° C. to about 350° C. In another embodiment, the predetermined range of about 170° C. to about 300° C. In one embodiment, the method of curing a binder includes causing the particulate temperature control additive to undergo an endothermic process consuming about 200 calories per gram of the particulate temperature control additive [837 J/g].

In illustrative embodiments, a method of manufacturing an insulation product comprises contacting a collection of fibers with a binder to form an uncured insulation product, contacting the collection of fibers with a temperature control additive, shaping the uncured insulation product into a configuration adapted for an insulating purpose, applying an amount of energy to the uncured insulation product subsequent to contacting the collection of fibers with a temperature control additive, the amount of energy sufficient to initiate an exothermic process transitioning the binder from an uncured state to a cured state, and maintaining the temperature of the binder within a predetermined range. In one embodiment, the method of manufacturing an insulation product further comprises forming a dispersion comprising the binder and the temperature control additive, wherein contacting the collection of fibers with the binder and contacting the collection of fibers with the temperature control additive occur concurrently through contacting the collection of fibers with the dispersion including the binder and the temperature control additive. In another embodiment, forming the dispersion includes adding a surfactant. In yet another embodiment, the method of manufacturing an insulation product of further comprises forming an aqueous dispersion of the temperature control additive and a surfactant, wherein contacting the collection of fibers with the temperature control additive occurs subsequently to contacting the collection of fibers with the binder. In one embodiment, contacting the collection of fibers with the temperature control additive includes distributing the temperature control additive, the temperature control additive being in the form of a powder, onto the uncured insulation product. In another embodiment, shaping the uncured insulation product includes shaping the uncured insulation product into a configuration adapted for insulating walls. In yet another embodiment, shaping the uncured insulation product includes shaping the uncured insulation product into a configuration adapted for insulating pipes. In another embodiment, shaping the uncured insulation product includes shaping the uncured insulation into a shape adapted to a pipe insulation product.

The additive can be applied in form of an aqueous dispersion sprayed on the fibrous product or by applying the additive as a powder on top of at least one surface of the product. In case the additive is applied in form of an aqueous dispersion, it could be added to the binder formulation that is sprayed on the fibrous product. This can be achieved by either homogeneously mixing the additive in the binder formulation batch, or by inline-injection of an aqueous dispersion of the additive to the binder formulation just prior to the application point of the binder formulation to the fibrous product. Dispersions of the water release additive can be achieved as known in the art, i.e. by use of suitable mixing devices, dispersing agents, and if needed by using coated water release additives.

The combination of binder and temperature control additive of the present disclosure is distinguishable from those binder formulations previously developed utilizing phenol-formaldehyde (PF) binder chemistries. In particular, those binders described in U.S. Pat. Nos. 3,907,724, 3,919,134, 3,956,204, and 5,043,214 each disclose modifying the binder reactants so that the binder resists self-heating during curing. This approach is disfavored because it involves the modification of the binder chemistry. Modification of the binder chemistry for the purpose of avoiding self-heating is undesirable because modifications necessarily entail a compromise with some other characteristic (i.e. strength, weatherability, cost). As described above, it is also undesirable to have multiple binder formulations within a manufacturing facility because certain products or processes tend to exhibit deleterious self-heating. The temperature control additives described herein do not require modification of the binder chemistry; thus, they can be used without compromising the binder properties or changing binder compositions between the various products and processes.

Additional features of the present disclosure will become apparent to those skilled in the art upon consideration of illustrative embodiments exemplifying the best mode of carrying out the disclosure as presently perceived.

Embodiments of the invention are further described by the following enumerated clauses:

1. A fiber product comprising a binder, a collection of fibers, and a particulate selected from a group consisting of magnesia, alumina, and calcined gypsum, wherein the binder is disposed upon the collection of fibers and the particulate is distributed within the fiber product.

2. The fiber product of clause 1, wherein the particulate has a number weighted average particle size of less than about 200 micrometers.

3. The fiber product of clause 1, wherein the particulate has a number weighted average particle size of less than about 50 micrometers.

4. The fiber product of clause 1, wherein the particulate has a number weighted average particle size of less than about 20 micrometers.

5. The fiber product of any one of clauses 1-4, wherein the wherein the fiber product comprises from about 0.25% to about 15% by weight of the particulate.

6. The fiber product of any one of clauses 1-5, wherein the wherein the fiber product comprises from about 3% to about 30% by weight of the binder.

7. The fiber product of any one of clauses 1-6, wherein the wherein the binder comprises a reaction product of a carbohydrate and an amine.

8. The fiber product of clause 7, wherein the carbohydrate comprises a monosaccharide and the amine comprises a primary amine.

9. The fiber product of clause 7, wherein the carbohydrate comprises dextrose, fructose, or mixtures thereof.

10. The fiber product of any one of clauses 1-9, wherein the particulate is dispersed within the binder.

11. A mineral fiber insulation product comprising a binder, a collection of mineral fibers, and a particulate selected from a group consisting of magnesia, alumina, and calcined gypsum wherein the binder is disposed upon the collection of mineral fibers and the particulate is distributed within the mineral fiber insulation product.

12. The mineral fiber insulation product of clause 11, wherein the mineral fiber insulation product comprises about 61% to about 96% mineral fibers and about 1% to about 15% of the particulate.

13. The mineral fiber insulation product of clause 11 or 12, wherein the particulate has a number weighted average particle size of less than about 200 micrometers.

14. The mineral fiber insulation product of clause 11 or 12, wherein the particulate has a number weighted average particle size of less than about 50 micrometers.

15. The mineral fiber insulation product of any one of clauses 11-14, wherein the binder is a product of reacting a carbohydrate and an amine.

16. The mineral fiber insulation product of any one of clauses 11-15, further comprising an organosilane in contact with the particulate.

17. An uncured fiber product comprising an uncured binder, a collection of fibers, and a temperature control additive, wherein the uncured binder is disposed upon the collection of fibers and the temperature control additive is a particulate in contact with the collection of fibers, in contact with the binder, or dispersed throughout the uncured fiber product.

18. The uncured fiber product of clause 17, wherein the temperature control additive is selected from a group consisting of aluminum hydroxide, magnesium hydroxide, calcium silicate hydrates, and calcium sulfate dihydrate.

19. The uncured fiber product of clause 17 or 18, wherein the uncured binder comprises a carbohydrate and an amine.

20. The uncured fiber product of clause 19, wherein the carbohydrate is selected from a group consisting of dextrose, xylose, fructose, dihydroxyacetone, and mixtures thereof.

21. The uncured fiber product of any one of clauses 17-20, wherein the amine is an ammonium salt or a primary amine.

22. The uncured fiber product of any one of clauses 17-21 comprising about 61% to about 96% fibers, about 1% to about 15% of the temperature control additive, and 3% to about 30% of the uncured binder.

23. The uncured fiber product of any one of clauses 17-22, further comprising a silicon containing compound, wherein the silicon containing compound is concentrated at a first interface between the uncured binder and the fibers and at a second interface between the uncured binder and the temperature control additive.

24. A method of curing a binder having a temperature control additive, comprising heating an uncured binder to a temperature within a predetermined temperature range, the temperature range being high enough to cure the binder but low enough so as to not burn the binder and maintaining the temperature within the predetermined temperature range for a time sufficient to substantially cure the binder, wherein maintaining the temperature includes the temperature control additive undergoing an endothermic process.

25. The method of clause 24, wherein the predetermined temperature range is from about 100.degree. C. to about 350.degree. C.

26. The method of clause 24, wherein the predetermined temperature range is from about 170.degree. C. to about 300.degree. C.

27. The method of any one of clauses 24-26, wherein the predetermined temperature range has as its lower boundary a temperature sufficient to initiate a curing reaction.

28. The method of any one of clauses 24-27, wherein the predetermined temperature range has as its upper boundary a temperature at which the binder ignites.

29. The method of any one of clauses 24-28, the temperature control additive undergoing an endothermic process comprising a decomposition, a phase transition, or a dehydration.

30. The method of curing a binder of clause 29, wherein the temperature control additive undergoing an endothermic process consumes at least about 200 calories per gram of the particulate temperature control additive.

31. A method of manufacturing an insulation product comprising contacting a collection of fibers with a binder to form an uncured insulation product, contacting the collection of fibers with a temperature control additive, shaping the uncured insulation product into a configuration adapted for an insulating purpose, applying an amount of energy to the uncured insulation product subsequent to contacting the collection of fibers with the temperature control additive, the amount of energy sufficient to initiate an exothermic process curing of the binder from an uncured state to a cured state, and maintaining the temperature of the binder within a predetermined range.

32. The method of manufacturing an insulation product of clause 31 further comprising forming a dispersion comprising the binder and the temperature control additive, wherein contacting the collection of fibers with the binder and contacting the collection of fibers with the temperature control additive occur concurrently through contacting the collection of fibers with the dispersion including the binder and the temperature control additive.

33. The method of manufacturing an insulation product of clause 32, wherein forming the dispersion includes adding a surfactant.

34. The method of manufacturing an insulation product of any one of clauses 31-33 further comprising forming an aqueous dispersion of the temperature control additive and a surfactant, wherein contacting the collection of fibers with the temperature control additive occurs subsequently to contacting the collection of fibers with the binder.

35. The method of manufacturing an insulation product of clause 31, wherein contacting the collection of fibers with the temperature control additive includes sprinkling the temperature control additive onto the uncured insulation product, the temperature control additive being in the form of a dry powder or concentrated slurry.

36. The method of manufacturing an insulation product of any one of clauses 31-35, wherein shaping the uncured insulation product includes shaping the uncured insulation product into a configuration adapted for insulating walls.

37. The method of manufacturing an insulation product of any one of clauses 31-35, wherein shaping the uncured insulation product includes shaping the uncured insulation product into a configuration adapted for insulating pipes.

38. Use of a particulate selected from the group consisting of aluminum hydroxide, magnesium hydroxide, calcium silicate hydrates, and calcium sulfate dihydrate as a temperature control additive in the manufacture of fibrous products.

39. The use of clause 38, wherein the fibrous product is mineral wool insulation or fiberglass insulation.

EXAMPLES

Referring now to FIG. 1, shown is the temperature profile inside a curing fibrous product as a function of time for an illustrative carbohydrate-based binder and a comparable phenol formaldehyde based binder. The graph shows the temperature versus the time for three separate temperature probes. The solid black line shows the temperature of the curing oven used in this particular experiment measured with a probe inside the curing oven, but not in contact or direct proximity to either of the fibrous products. This temperature profile shows that the temperature inside the oven returns to the set temperature of 220° C. shortly after the fibrous products are inserted into the oven and the door is closed. The temperature of the oven was maintained at 220° C. by the temperature control electronics of the oven, thus it does not increase or decrease in response to the exothermic reactions occurring therein. The trace comprising the circular data markers shows the temperature inside of a sample of a fibrous product having a phenol formaldehyde (PF) based binder system. The trace comprising the (+) data markers shows the temperature inside of a sample of a fibrous product having a carbohydrate based binder system.

The temperature probes were placed in the center of a 6"×6"×6" cube of fiberglass insulation product initially comprising uncured binders. At time 0, the cubes were placed inside the curing oven. The PF binder was made according to the methods and formulations well-known in the art, such as U.S. Pat. No. 6,638,882 to Helbing et al. The comparative examples are binders made according to Published PCT Application WO 2009/019235. Specifically, Binder 1 includes dextrose, diammonium phosphate, and a silane. The traces show the temperature at the center of the cube over the course of 160 minutes.

Initially, the temperature inside the PF sample and the Binder 1 sample exhibit a similar behavior. Specifically, each of the probes shows a gradual increase in temperature. However, between 40 and 60 minutes the temperature inside the Binder 1 sample crosses over the trace of the PF sample and the curing oven temperature. Accordingly, the temperature inside the Binder 1 sample exceeds the temperature of the oven. This leads to the conclusion that the curing of Binder 1 is self-heating the product. It should be noted that the temperature inside the PF sample never significantly exceeds the oven temperature, thus the PF sample is not exhibiting significant self-heating. The temperature of the Binder 1 sample eventually reaches a maximum temperature of about 425° C. before the temperature begins to decrease. The decrease in temperature can be attributed to a lack of self-heating and a dissipation of heat which can be attributed to the completion of the curing reaction. The temperature reached by the Binder 1 sample was high enough so that the binder's properties were compromised by the elevated temperature. The temperature was sufficiently high to damage the product, thus the self-heating can be described as deleterious self-heating. However, it is noted that the product did not ignite and no flames were observed. Examination of the cured product did show that it was charred and discolored near its center.

Accordingly, FIG. 1 captures one aspect of the challenges presented by the new class of environmentally friendly binder compositions. The exothermic reaction which occurs during curing can result to deleterious self-heating.

Figure 2:
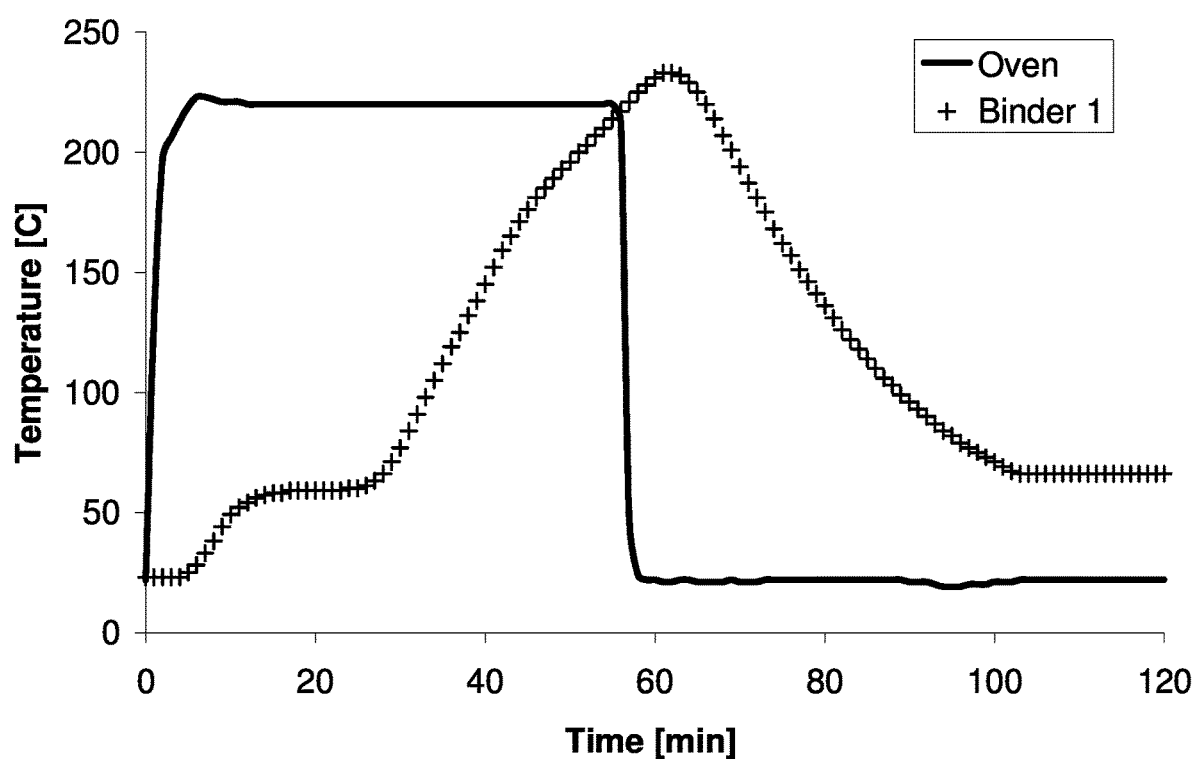
FIG. 2 shows the temperature profile inside a curing fibrous product as a function of time for an illustrative carbohydrate-based binder product in which the fibrous product was removed from the curing oven when the product reached 220° C.

As discussed herein, one approach to dealing with the exothermic nature of the curing reaction would be to change the process parameters to manage the temperature that the sample reaches. Referring now to FIG. 2, an exemplary fibrous product was made with the same composition and method as described with the Binder 1 sample as described above.

Figure 3:
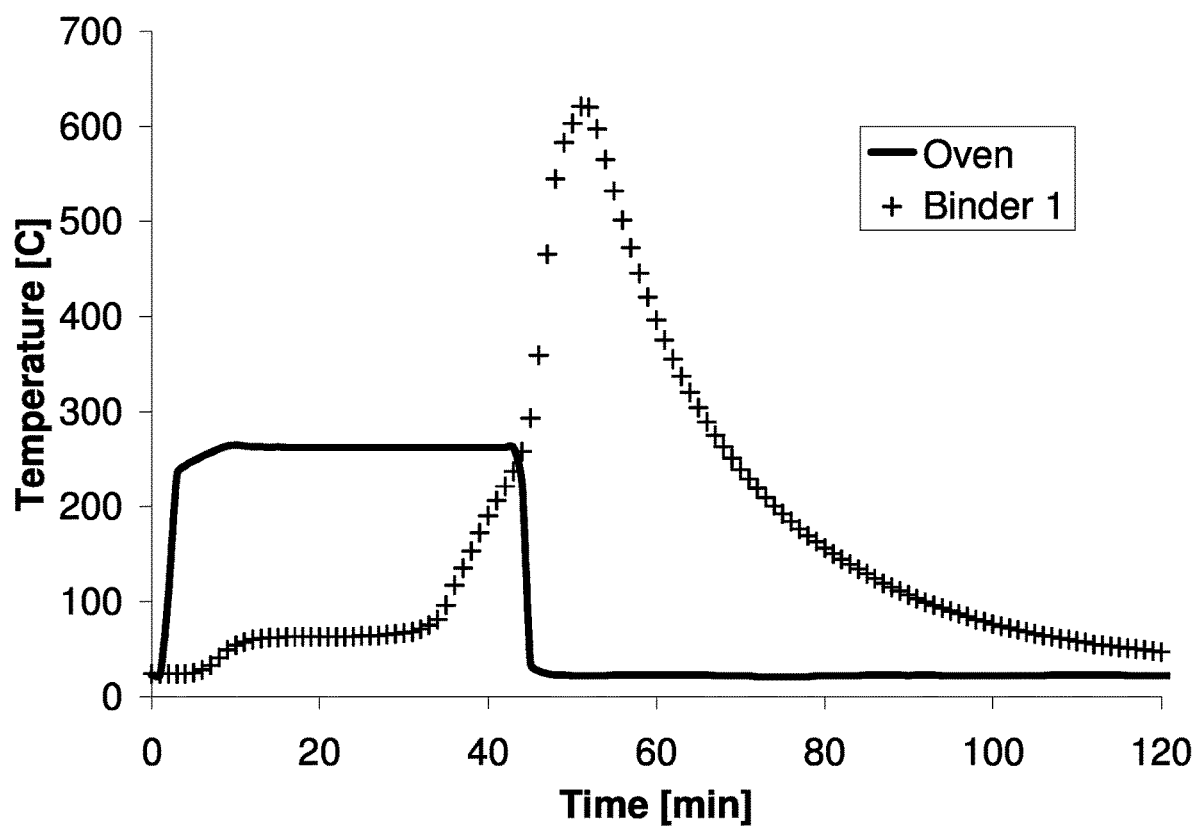
FIG. 3 shows the temperature profile inside a curing fibrous product as a function of time for an illustrative carbohydrate-based binder product in which the fibrous product was removed from the curing oven when the product reached 260° C.

Furthermore, the experiment was performed in an identical method as described above except that when the temperature inside the product reached the set point of the oven, the sample was removed from the curing oven. Because the sample was not in the oven, heat could dissipate from the product more readily and the temperature of the sample remained low. The self-heating did not become deleterious as the dissipation of heat prevented the temperature of the product from reaching temperatures which damaged the product. It should be noted that the product made in FIG. 2 may not have been cured sufficiently for adequate binder performance. Specifically, the temperature was maintained above 200° C. for only about 18 minutes. The residency time requirements are product specific. While this approach is useful, the inherent difficulty is shown in FIG. 3. FIG. 3 shows an identical experiment to that shown with respect to FIG. 2, except the curing oven is set to maintain 260° C. When the sample temperature reached the oven temperature, the sample was removed from the oven. However, the temperature of the sample continued to increase to approximately 620° C. At this temperature, deleterious self-heating is observed and much of the binder is severely burned.

Figure 4:
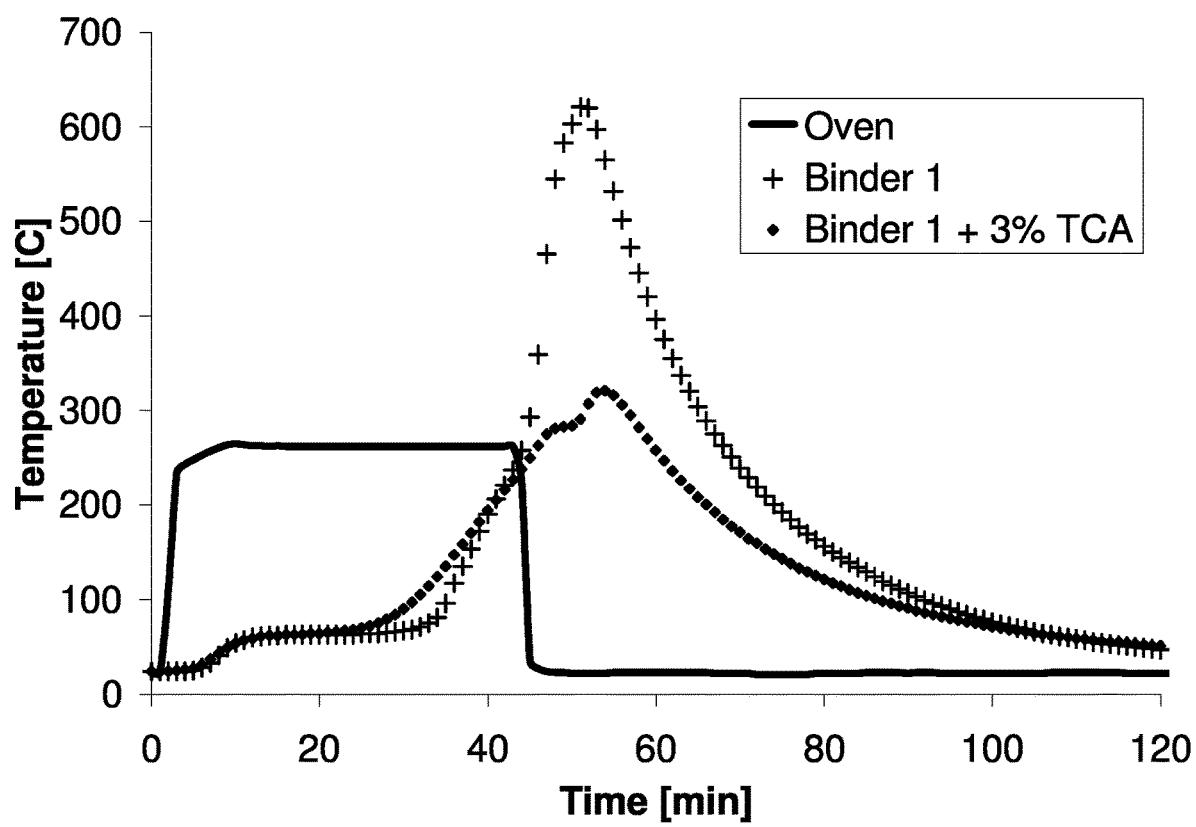
FIG. 4 shows the temperature profiles inside a curing fibrous product as a function of time for an illustrative carbohydrate-based binder product in which the fibrous product was removed from the curing oven when the product reached 260° C. and the illustrative carbohydrate-based binder product including 3% of a temperature control additive.

Referring now to FIG. 4, the experiment shown in FIG. 3 was repeated except with the inclusion of a temperature control additive. Specifically, a temperature control additive (designated as TCA in FIG. 3) was added at a level of 3% by weight, based on the total dried product. The temperature control additive was aluminum hydroxide, as described herein. The trace of the sample shows that the temperature control additive prevents the deleterious self heating and keeps the internal temperature of the sample to less than or equal to about 320° C. As such, the temperature control additive has prevented deleterious self-heating with a binder and process conditions that would typically exhibit deleterious self-heating (e.g. the example of shown in FIG. 3).

Figure 5:
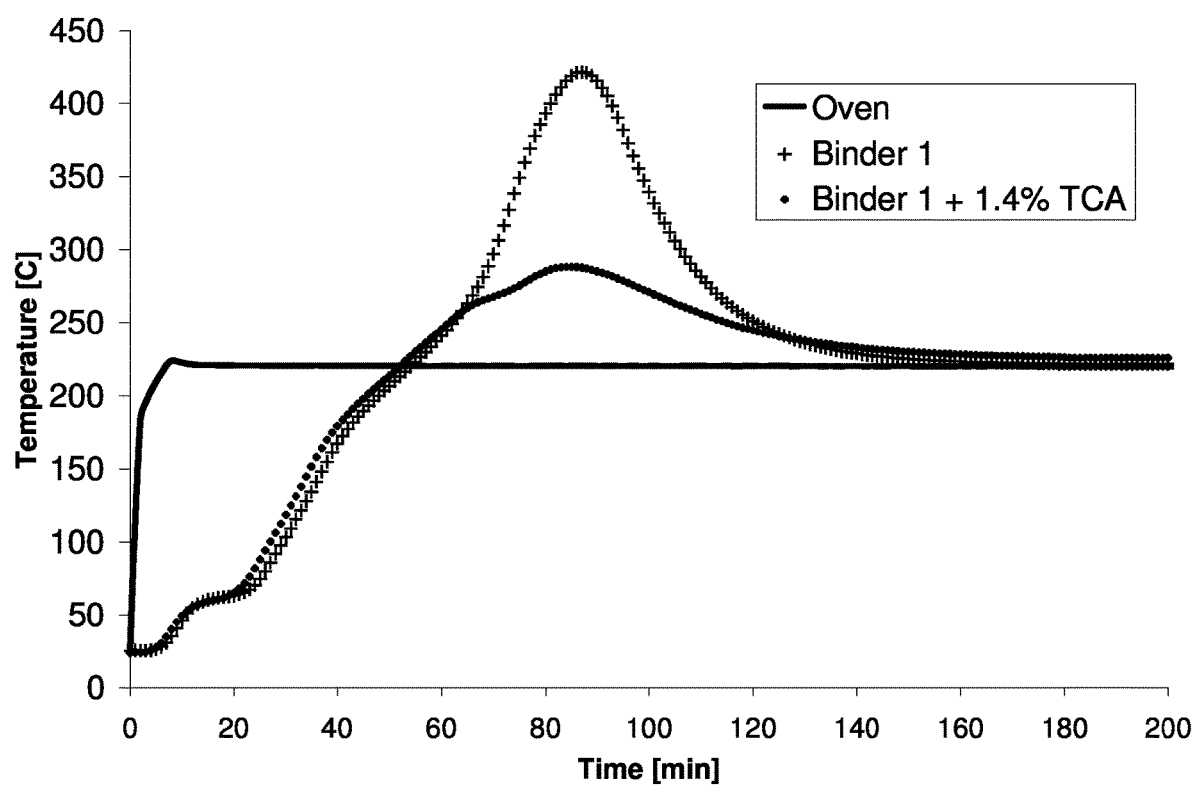
FIG. 5 shows the temperature profiles inside a curing fibrous product as a function of time for an illustrative carbohydrate-based binder product cured in an oven maintained at 220° C. with and without the inclusion of a temperature control.

Referring now to FIG. 5, shown is a comparison between a sample containing a temperature control additive added at a level of 1.4% by weight, based on the total dried product and a comparable sample without the temperature control additive. The samples were kept in the oven through the curing reaction. The sample containing the temperature control additive reached a maximum temperature of about 290° C. in the oven set at 220° C. The sample without the temperature control additive reached a maximum temperature of about 420° C. Thus, it is apparent that even relatively small amounts of a temperature control additive are sufficient to prevent deleterious self-heating.

Furthermore, it was found that the effectiveness of the temperature control additive was not limited to one particular method of applying it to the product. Illustratively, the same effectiveness was achieved by either applying the additive on the product in the form of an aqueous dispersion or by applying the additive in form of a powder on one product surface. It was also found that the temperature control additive can be added to the binder formulation that is sprayed onto the product prior to drying the binder solution to form an uncured product.

What is claimed is:

1. A method of manufacturing an insulation product, said method consisting of:
   contacting a collection of mineral fibers with a binder to form an uncured insulation product,
   contacting the collection of mineral fibers with a temperature control additive where the temperature control additive is a particulate having a number weighted average particle size of about 200 micrometers,
   shaping the uncured insulation product into a configuration adapted for an insulating purpose where the uncured insulation product comprises from about 0.5% to about 20% of the temperature control additive by weight, applying an amount of energy to the uncured insulation product subsequent to contacting the collection of mineral fibers with the temperature control additive, the amount of energy sufficient to (i) dehydrate the binder (ii) initiate an exothermic process transitioning the binder from an uncured state to a cured state in order to form a cured insulation product, and (iii) cause the temperature control additive to undergo an endothermic process consuming at least about 200 calories per gram of the temperature control additive, where drying and curing occur sequentially, simultaneously or concurrently, and where the cured insulation product comprises from about 0.2% to about 20% of the temperature control additive by weight, and maintaining the temperature of the binder within a predetermined range, wherein the binder comprises a reaction product of a carbohydrate and an amine, and wherein the binder is derived from a Maillard reaction.

2. The method of manufacturing an insulation product of claim 1, wherein contacting the collection of mineral fibers with the binder and contacting the collection of mineral fibers with the temperature control additive occur concurrently through contacting the collection of mineral fibers with a dispersion including the binder and the temperature control additive.

3. The method of manufacturing an insulation product of claim 1, wherein contacting the collection of mineral fibers with the temperature control additive occurs subsequently to contacting the collection of mineral fibers with the binder.

4. The method of manufacturing an insulation product of claim 1, wherein contacting the collection of mineral fibers with the temperature control additive includes sprinkling the temperature control additive onto the uncured insulation product, the temperature control additive being in the form of a dry powder or a slurry.

5. The method of manufacturing an insulation product of claim 1, wherein
shaping the uncured insulation product includes shaping the uncured insulation product into a configuration adapted for insulating walls.

6. The method of manufacturing an insulation product of claim 1, wherein
shaping the uncured insulation product includes shaping the uncured insulation product into a configuration adapted for insulating pipes.

7. The method of manufacturing an insulation product of claim 1, wherein the insulation product comprises from about 0.25% to about 15% by weight of the particulate.

8. The method of manufacturing an insulation product of claim 1, wherein the insulation product comprises from about 3% to about 30% by weight of the binder.

9. The method of manufacturing an insulation product of claim 1, wherein the insulation product comprises about 61% to about 96% by weight of mineral fibers and about 1% to about 15% by weight of the particulate.

10. The method of manufacturing an insulation product of claim 1, wherein the carbohydrate comprises a monosaccharide and the amine comprises a primary amine.

11. The method of manufacturing an insulation product of claim 1, wherein the carbohydrate comprises dextrose, fructose, or mixtures thereof.

12. The method of manufacturing an insulation product of claim 1, wherein the amine is an ammonium salt or a primary amine.

13. The method of manufacturing an insulation product of claim 12, wherein the ammonium salt is selected from the group consisting of diammonium phosphate, diammonium sulfate, and triammonium citrate.

14. The method of manufacturing an insulation product of claim 1, wherein the binder further comprises an organosilane in contact with the particulate.

15. The method of manufacturing an insulation product of claim 1, wherein the temperature control additive is selected from a group consisting of aluminum hydroxide, magnesium hydroxide, calcium silicate hydrates, and calcium sulfate dihydrate.

16. The method of manufacturing an insulation product of claim 1, wherein the endothermic process comprises decomposition, dehydration, or a phase transition.

* * * * *